United States Patent [19]

Kido et al.

[11] Patent Number: 4,811,122

[45] Date of Patent: Mar. 7, 1989

[54] MAGNETIC RECORDING/REPRODUCING APPARATUS WHICH ACCOMODATES DIFFERENT TAPE TYPES

[75] Inventors: Koichi Kido, Yokosuka; Kenji Shibayama, Tokyo; Yutaka Isobe, Yokohama; Masahiko Tsuruta, Yokohama; Hiroshi Yamada, Yokohama, all of Japan

[73] Assignee: Victor Company of Japan Ltd., Kanagawa, Japan

[21] Appl. No.: 61,337

[22] Filed: Jun. 10, 1987

[30] Foreign Application Priority Data

Jun. 11, 1986 [JP] Japan .................................. 61-135608
Jun. 11, 1986 [JP] Japan .................................. 61-135613
Jun. 18, 1986 [JP] Japan .................................. 61-140203
Aug. 25, 1986 [JP] Japan .................................. 61-198727
Oct. 2, 1986 [JP] Japan .................................. 61-234955

[51] Int. Cl.$^4$ ............................................. G11B 15/02
[52] U.S. Cl. ....................................... 360/25; 360/66; 360/31; 360/69
[58] Field of Search ................. 360/25, 65, 66, 31, 360/69

[56] References Cited

U.S. PATENT DOCUMENTS 4,484,237 11/1984 Muto ...................................... 360/25
4,554,599 11/1985 Shiozaki ............................... 360/69

Primary Examiner—Robert L. Richardson
Attorney, Agent, or Firm—Michael N. Meller

[57] ABSTRACT

A magnetic recording and/or reproducing apparatus comprises a cassette discriminating circuit for discriminating whether a loaded tape cassette accommodates a standard tape or a high performance tape in a recording mode, a mode discriminating circuit for discriminating from a signal reproduced from the tape in a reproducing mode a mode with which the tape was recorded at the time of the recording, and a switching circuit for automatically switching the operation mode to a predetermined mode responsive to the discrimination made by the cassette discriminating circuit in the recording mode and responsive to the discrimination made by the mode discriminating circuit in the reproducing mode. The high performance tape is playable either in a standard mode or a high quality mode.

14 Claims, 20 Drawing Sheets

FIG.28
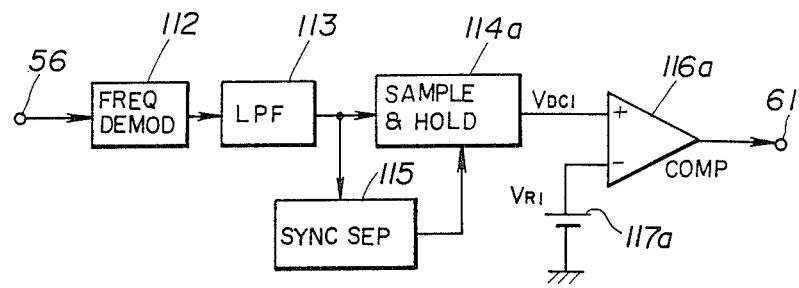
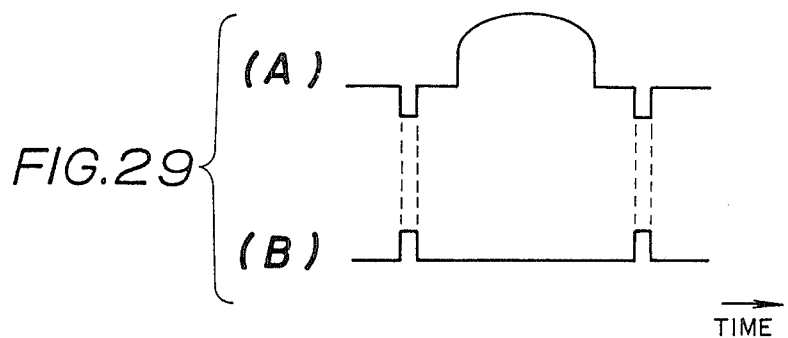
FIG.29

FIG. 30
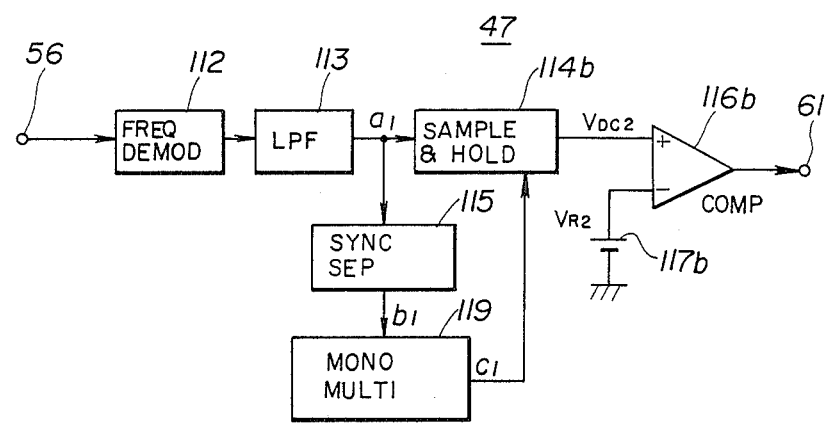
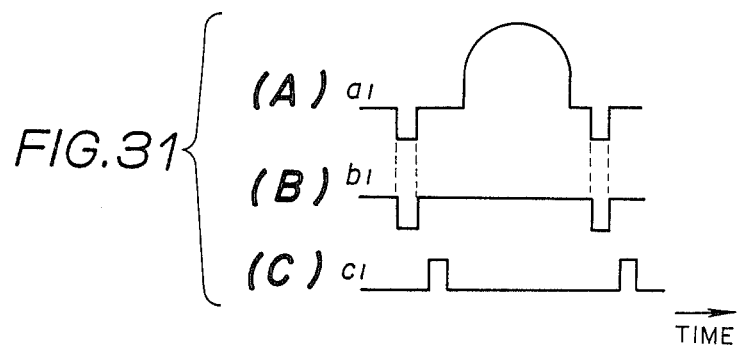
FIG. 31
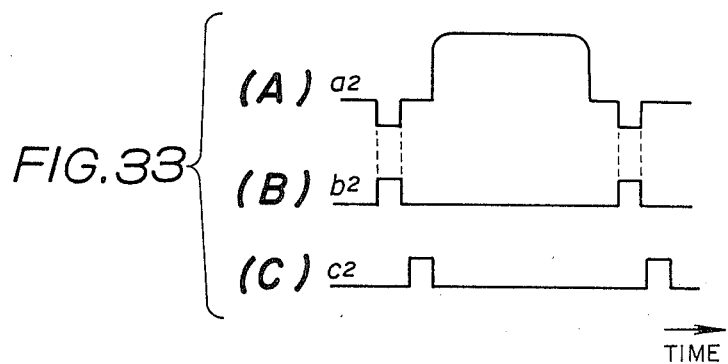
FIG. 33

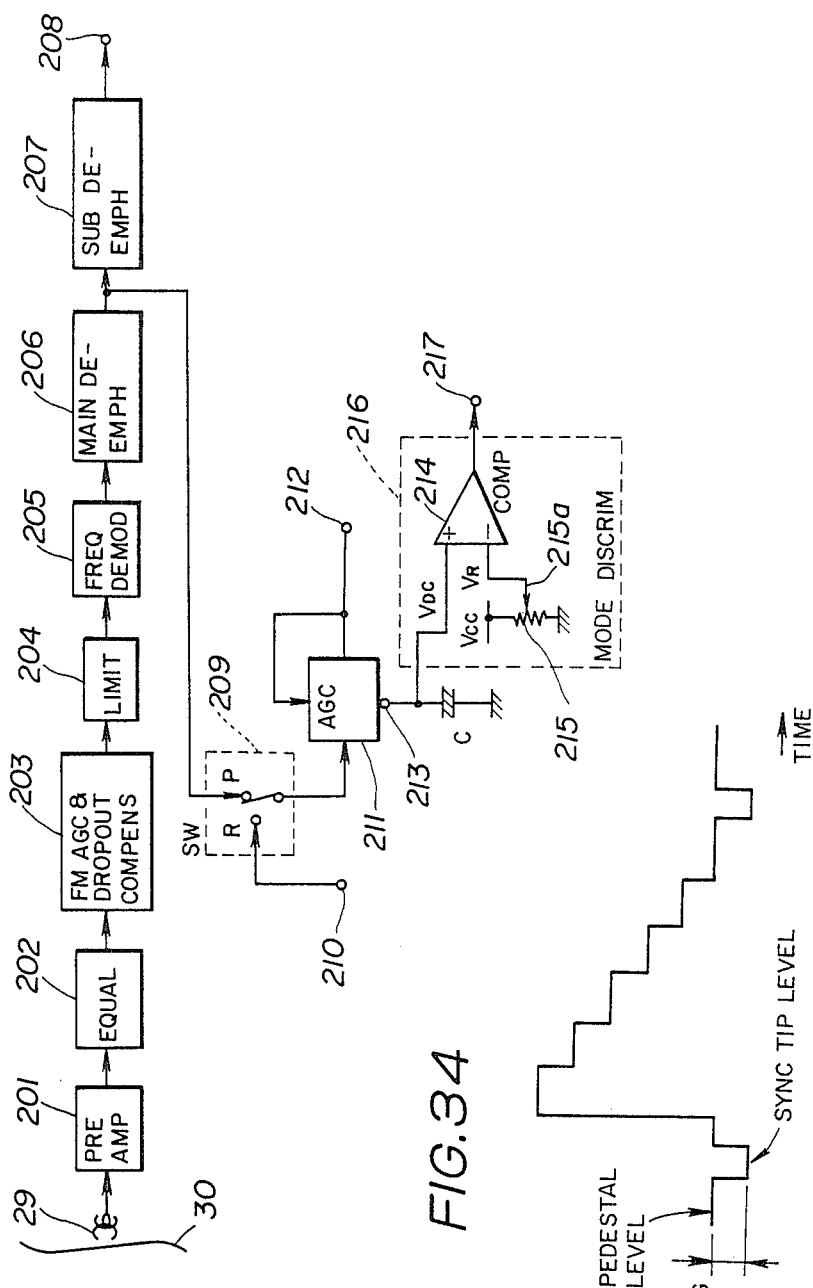

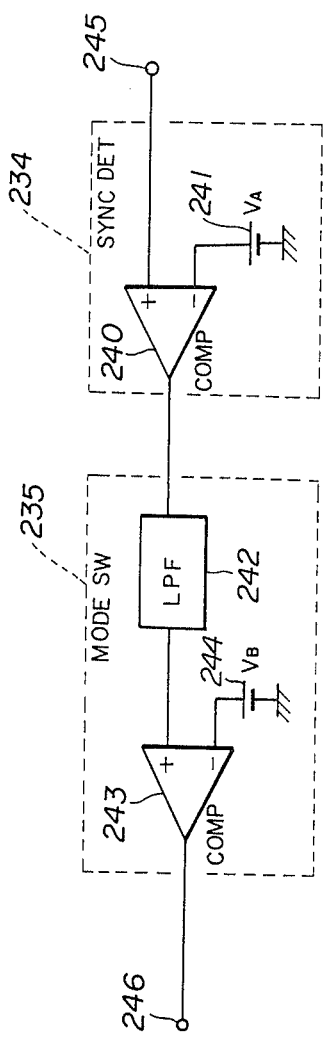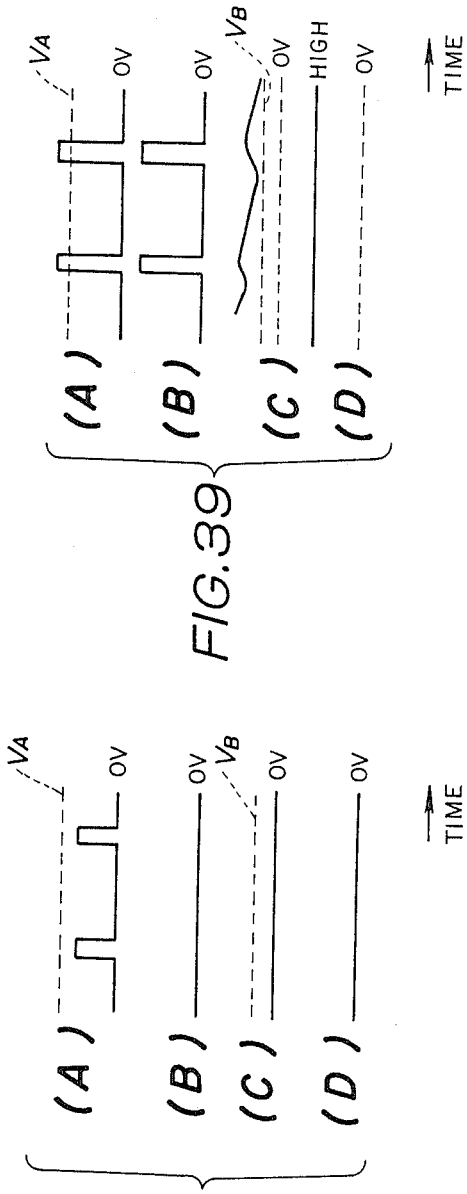

MAGNETIC RECORDING/REPRODUCING APPARATUS WHICH ACCOMODATES DIFFERENT TAPE TYPES

BACKGROUND OF THE INVENTION

The present invention generally relates to magnetic recording and/or reproducing apparatuses, and more particularly to a magnetic recording and/or reproducing apparatus which has at least two modes with mutually different carrier frequencies and automatically carries out the recording and/or the reproduction in one of the two modes.

Presently, an existing video tape recorder (hereinafter simply referred to as a VTR) for home use employs a standard magnetic tape (hereinafter simply referred to as standard tape) with a tape width of ½ inch. This standard tape is an iron oxide magnetic tape having a coercivity Hc of approximately 600 Oe to 750 Oe and a residual flux density Br of approximately 1100 G to 1300 G, for example. The recording is carried out on the standard tape with the carrier frequency set between approximately 3.4 MHz and 5.5 MHz, and for example, the carrier frequency is set between 3.4 MHz and 4.4 MHz. However, due to the recent improvements in the performance of the magnetic tape and the magnetic head, there is a demand for a VTR which can record and reproduce a high quality picture having a higher resolution.

For this reason, a VTR has been proposed in which the recording is intended to be made on a high performance magnetic tape (hereinafter simply referred to as high performance tape) such as a metal magnetic tape (hereinafter simply referred to as a metal tape) with the carrier frequency of 5 MHz to 7 MHz, for example, which is adequately high for utilizing the high quality and resolution recording (hereinafter referred to as a high quality mode). One of such high performance tape is a type of metal magnetic tape already used in the so-called 8-mm VTRs and the VTRs for professional use, and has a coercivity Hc of approximately 1300 Oe to 1500 Oe and a residual flux density Br of approximately 2700 G to 2800 G.

Because of the fact that the higher carrier frequency and other recording and reproducing parameters, which are different from that of the standard mode, are needed for the high quality mode, the signals recorded on a tape in the high quality mode cannot be reproduced in the standard mode or vice versa. In other words, there is no electro-magnetic compatibility between the standard and high quality modes.

There is another problem of tape itself that if the high performance tape mentioned in the foregoing paragraph was attempted to be used with the existing VTR for home use and played in the standard mode, the desired performance would not be obtained because the recording current flowing to its magnetic head would be insufficient for the coercivity Hc of the high performance tape which is approximately 1300 Oe or over and is considerably high compared to that of the standard tape. Furthermore, a poor audio performance due to its long wavelength in the recording and reproduction and a poor erasing performance would result. For these reasons, this type of metal high performance tape is unsuited for the standard mode.

On the other hand, the standard tape is unsuited for the high quality mode because of the poor performance mainly due to its low coercivity compared to that of the high performance tape.

In this regard, it is conceivable to design a type of VTR having exclusively the high quality mode for using the high performance tape only, but this type of VTR naturally has no tape interchangeability with the existing VTR for home use. If utilized, it would be disadvantageous to the user in that he must have both the existing VTR for playing the standard tape in the standard mode and another type of VTR for playing the high performance tape in the high quality mode, and the high performance tape is unusable on the existing VTR.

Hence, it comes to develop a VTR having a switching means for switching the operation mode between the standard and high quality modes, and to develop a high performance tape accommodated within a tape cassette which has an external form and size identical to those of the existing tape cassette accommodating the standard tape and has magnetic characteristics acceptable for both the standard and the high quality modes, which makes the tape usable in both the modes. In this case, the user operates the switching means to select the appropriate one of the standard and high quality modes depending on which mode he wishes to use for recording or which mode of recorded tape cassette he is going to playback. But in this case, the user must visually identify the tape cassette which accommodates either the standard or the high performance tape every time a tape cassette is loaded into the VTR, and the user may make an error in identifying the tape cassette. As a result, the user may carry out a recording on the standard tape in the high quality mode, and in this case, no satisfactory reproduced picture is obtained at the time of the reproduction and the user may mistake that the VTR is malfunctioning. The user may make a similar error when carrying out the reproduction with a tape of the standard or the high performance tape in the wrong mode.

In addition, because the tape cassettes accommodating the standard tape and the high performance tape have identical external form and size, the owner of the existing VTR exclusively with the standard mode may erroneously purchase a tape cassette accommodating the high performance tape. In this case, the owner of the existing VTR can use mechanically the tape cassette on his VTR but, the quality and the cost of the tape cassette may be more than necessary for his purpose. Hence, it would be confusing to the user when such two types of cassettes having identical external form and size are put on the market.

SUMMARY OF THE INVENTION

Accordingly, it is a general object of the present invention to provide a magnetic recording and/or reproducing apparatus in which the problems described heretofore are eliminated.

Another and more specific object of the present invention is to provide a magnetic recording and/or reproducing apparatus which comprises cassette discriminating means for discriminating whether a loaded tape cassette accommodates a standard tape or a high performance tape in a recording mode, mode discriminating means for discriminating from a signal reproduced from the tape in a reproducing mode a mode with which the tape was recorded at the time of the recording, and switching means for automatically switching the operation mode to a predetermined mode responsive to the discrimination made by the cassette discriminating means in the recording mode and responsive to the discrimination made by the mode discriminating means in the reproducing mode. The high performance tape is playable either in a standard mode or a high quality mode. According to the apparatus of the present invention, there is no need for the user to visually discriminate the kind of the loaded tape cassette nor manually select the mode in which the tape is to be played.

Still another object of the present invention is to provide a magnetic recording and/or reproducing apparatus in which the switching means automatically switches the operation mode to either one of the standard and high quality modes responsive to the discrimination made by the cassette discriminating means in the recording mode and responsive to the discrimination made by the mode discriminating means in the reproducing mode. According to the apparatus of the present invention, it is possible to positively prevent the standard tape from being played in the high quality mode.

A further object of the present invention is to provide a magnetic recording and/or reproducing apparatus in which the switching means includes means for manually setting the operation mode to the standard mode when the loaded tape cassette accommodates the high performance tape. According to the apparatus of the present invention, it is possible to play the high performance tape in the standard mode.

Another object of the present invention is to provide a magnetic recording and/or reproducing apparatus in which the mode discriminating means discriminates the mode with which the tape was recorded at the time of the recording based on the carrier frequency of the reproduced signal.

Still another object of the present invention is to provide a magnetic recording and/or reproducing apparatus in which the mode discriminating means discriminates the mode with which the tape was recorded at the time of the recording based on the carrier frequency corresponding to a pedestal level of the reproduced signal.

A further object of the present invention is to provide a magnetic recording and/or reproducing apparatus in which the mode discriminating means discriminates the mode with which the tape was recorded at the time of the recording based on the carrier frequency corresponding to the pedestal level in a horizontal blanking period and/or a vertical blanking period of the reproduced signal.

Another object of the present invention is to provide a magnetic recording and/or reproducing apparatus in which the mode discriminating means discriminates the mode with which the tape was recorded at the time of the recording based on the carrier frequency corresponding to a synchronizing tip level of the reproduced signal.

Still another object of the present invention is to provide a magnetic recording and/or reproducing apparatus in which the mode discriminating means discriminates the mode with which the tape was recorded at the time of the recording based on the carrier frequency corresponding to the synchronizing tip level in a horizontal blanking period and/or a vertical blanking period of the reproduced signal.

A further object of the present invention is to provide a magnetic recording and/or reproducing apparatus in which the mode discriminating means discriminates the mode with which the tape was recorded at the time of the recording based on the carrier frequency corresponding to the pedestal level and the synchronizing tip level of the reproduced signal.

Another object of the present invention is to provide a magnetic recording and/or reproducing apparatus in which the mode discriminating means discriminates the mode with which the tape was recorded at the time of the recording based on a D.C. level of the reproduced signal.

Still another object of the present invention is to provide a magnetic recording and/or reproducing apparatus in which the mode discriminating means discriminates the mode with which the tape was recorded at the time of the recording based on the D.C. level during a pedestal interval and/or a synchronizing interval of the reproduced signal.

A further object of the present invention is to provide a magnetic recording and/or reproducing apparatus in which the mode discriminating means discriminates the mode with which the tape was recorded at the time of the recording based on a carrier frequency deviation of the reproduced signal.

Other objects and further features of the present invention will be apparent from the following detailed description when read in conjunction with the accompanying drawings.

BRIEF DESCRIPTION OF THE DRAWINGS

FIG. 28 is a system block diagram showing a seventh embodiment of the mode discriminating circuit in the block system shown in FIG. 1;

FIGS. 29(A) and 29(B), are time charts for explaining the operation of the block system shown in FIG. 28;

FIG. 30 is a system block diagram showing an eighth embodiment of the mode discriminating circuit in the block system shown in FIG. 1;

FIGS. 31(A) through 31(c) are time charts for explaining the operation of the block system shown in FIG. 30;

FIGS. 33(A) through 33(C) are time charts for explaining the operation of the block system shown in FIG. 32;

FIG. 34 is a diagram for explaining third and fourth embodiments of the magnetic recording and/or reproducing apparatus according to the present invention;

FIG. 35 is a system block diagram showing an essential part of the third embodiment of the magnetic recording and/or reproducing apparatus;

FIG. 37 is a system circuit diagram showing an embodiment of an essential part of a mode discriminating circuit in the fourth embodiment of the magnetic recording and/or reproducing apparatus; and FIGS. 38(A) through 38(D) and FIGS. 39(A) through 39(D) show signal waveforms for explaining the operation of the circuit system shown in FIG. 37.

DETAILED DESCRIPTION

Figure 1:
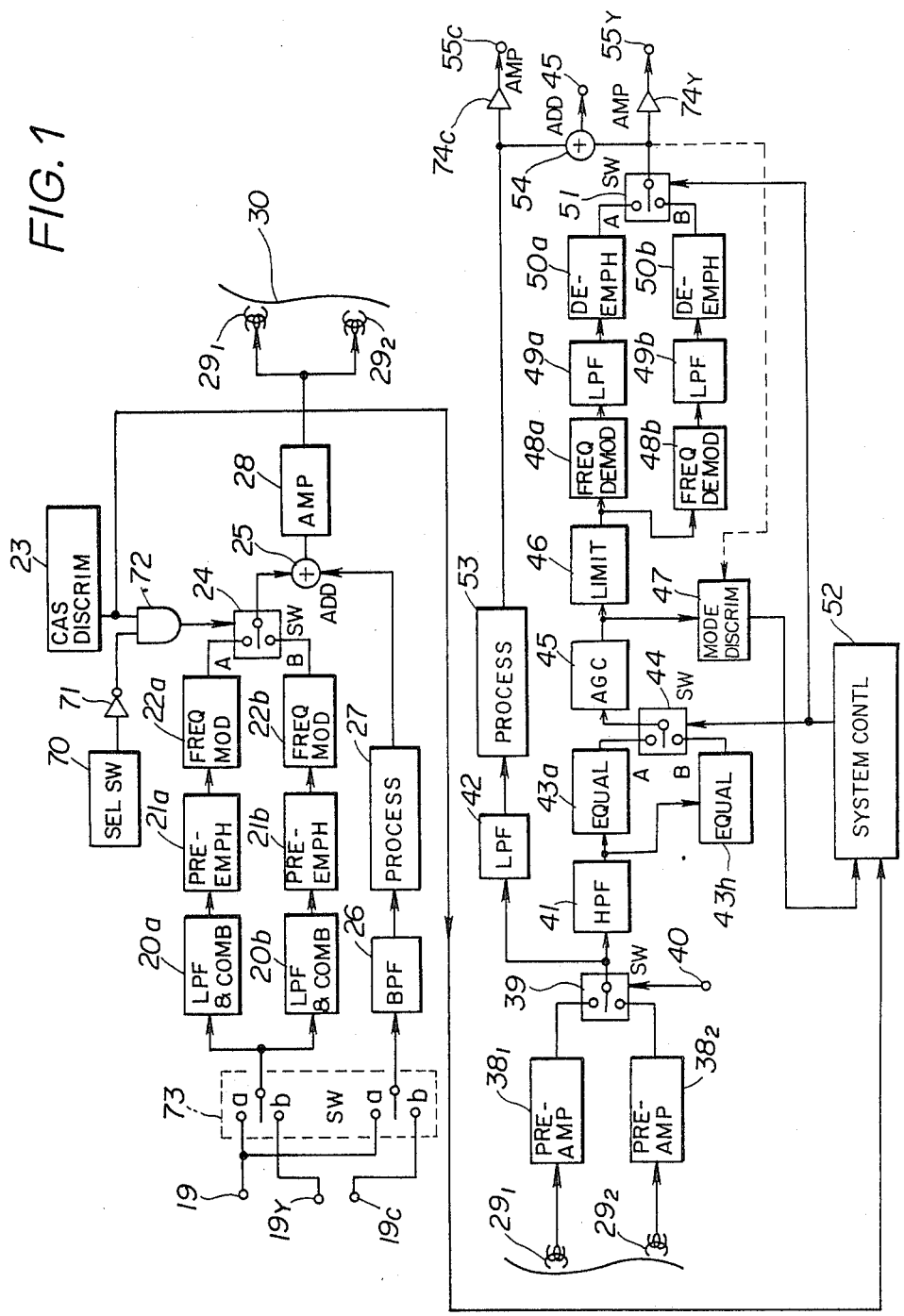
FIG. 1 is a system block diagram showing a first embodiment of the magnetic recording and/or reproducing apparatus according to the present invention.
Figure 2:
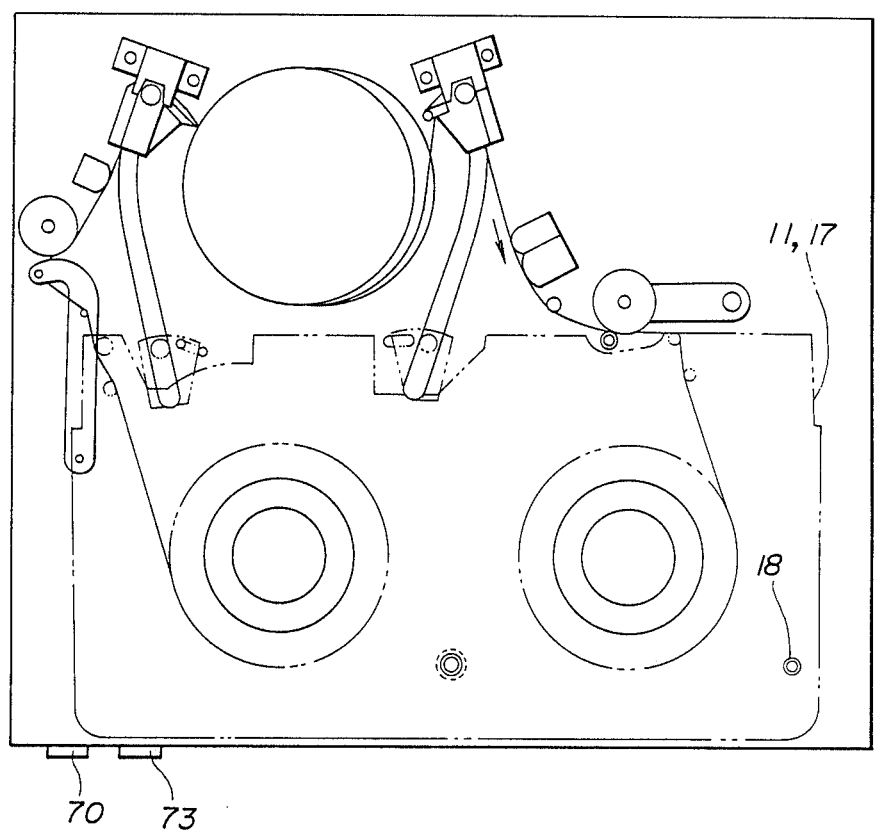
FIG. 2 is a plan view generally showing the first embodiment of the magnetic recording and/or reproducing apparatus.
Figure 3:
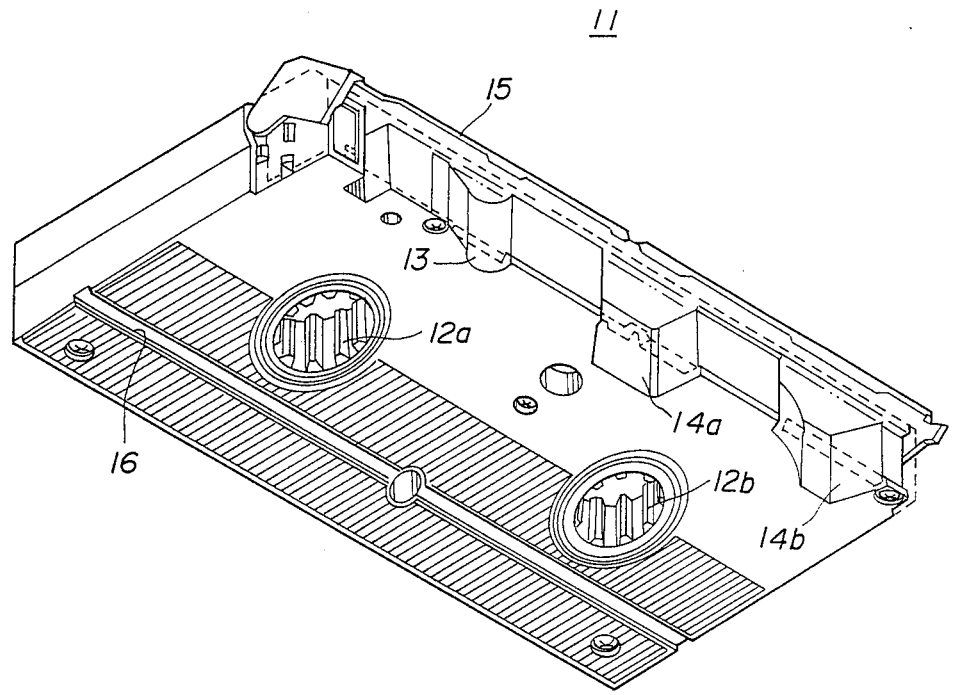
FIG. 3 is a perspective view showing a standard tape cassette from a bottom thereof.

FIG. 1 shows a first embodiment of the magnetic recording and/or reproducing apparatus (VTR) according to the present invention, and FIG. 2 generally shows the plan view of the first embodiment. FIG. 3 shows a standard tape cassette 11 which is originally designed for use on the the existing VTR for home use and accommodates a standard magnetic tape (not shown) with a tape width of ½ inch. This standard tape is an iron oxide magnetic tape having a coercivity Hc of approximately 600 Oe to 750 Oe and a residual flux density Br of approximately 1100 G to 1300 G, for example. The standard tape cassette 11 comprises holes 12a and 12b for receiving reel driving shafts of the VTR, a depression 13 into which a capstan of the VTR fits, recesses 14a and 14b into which tape draw-out members of the VTR enter, a lid 15, and a groove 16 for preventing erroneous insertion of the tape cassette 11 into the VTR facing an incorrect direction. The standard tape accommodated within the standard tape cassette 11 is only suited for play in standard recording and reproducing modes.

Figure 4:
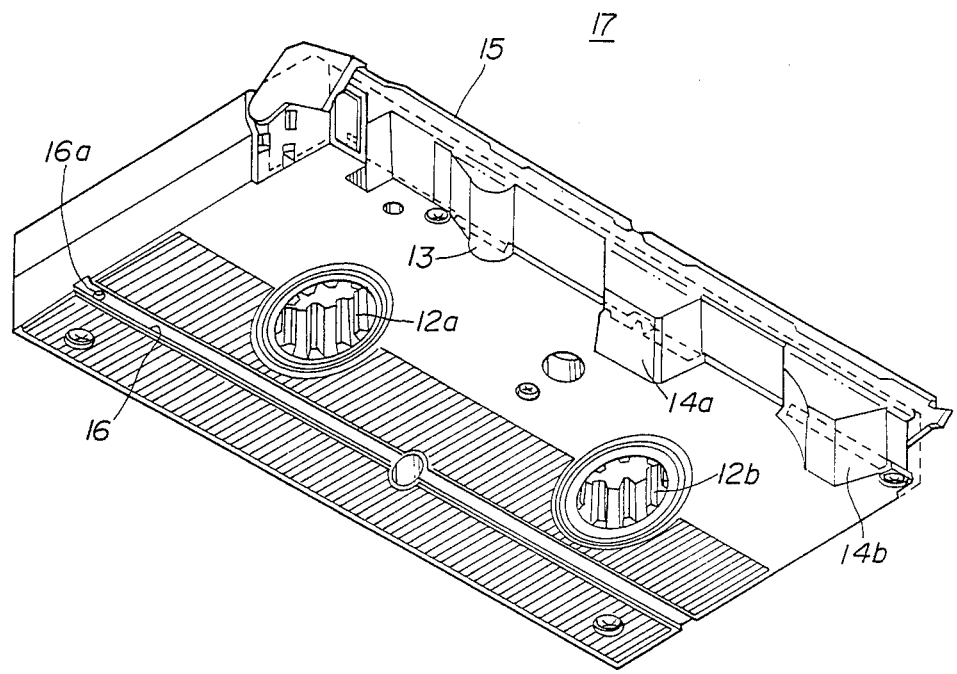
FIG. 4 is a perspective view showing an embodiment of a high performance tape cassette from a bottom thereof.

On the other hand, FIG. 4 shows a high performance tape cassette 17 which is originally designed for use on the VTR according to the present invention. In FIG. 4, those parts which are the same as those corresponding parts in FIG. 3 are designated by the same reference numerals, and a description thereof will be omitted. The external form and size of the high performance tape cassette 17 are approximately the same as those of the standard tape cassette 11. The high performance tape cassette 17 additionally comprises a hole 16a formed in a portion of the groove 16, and this hole 16a is used as a cassette discriminating part for discriminating the kind of tape cassette.

The high performance tape cassette 17 accommodates a high performance magnetic tape (not shown) with a tape width of ½ inch. When the recording is carried out with respect to the high performance tape with a current which is approximately 20% greater than an optimum recording current for the standard tape used on the existing VTR for home use and the recording wavelength of the luminance signal is set to 1.3 $\mu$m, 0.97 $\mu$m and 0.73 $\mu$m, the reproduced output values obtained from this high performance tape respectively are at least 7 dB, 8.5 dB and 10 dB greater than a maximum reproduced output value obtainable from the standard tape. In addition, the audio signal erasure efficiency of this high performance tape is better than $-65$ dB. For example, this high performance tape uses a cobalt (Co) deposited iron oxide magnetic material as the magnetic layer, has a coercivity Hc of approximately 750 Oe to 950 Oe, has a residual flux density Br of 1250 G or over, and the grain (particle) length of the magnetic layer is at least 0.2 $\mu$m or less. On the other hand, the high performance tape may use a metal magnetic material as the magnetic layer, have a coercivity Hc of approximately 700 Oe to 850 Oe, has a residual flux density Br of 2600 G to 2800 G, and the grain (particle) length of the magnetic layer may be at least 0.16 $\mu$m or less. This high performance tape accommodated within the high performance tape cassette 17 may be played either in the standard recording and reproducing modes or in high quality recording and reproducing modes, although this high performance tape is primarily designed for play in the high quality mode.

In FIG. 2, a cassette discriminating pin 18 is supported by a spring (not shown), for example, and is movable up and down (away from and into the paper in FIG. 2) between a raised position and a lowered position. The pin 18 is located at such a position in a cassette loading part of the VTR that the pin 18 enters into the hole 16a of the high performance tape cassette 17 when the high performance tape cassette 17 is loaded into the VTR. Hence, the pin 18 is in the raised position when the high performance tape cassette 17 is loaded into the VTR and is in the lowered position when the standard tape cassette 11 is loaded into the VTR because the standard tape cassette 11 has no hole 16a. A standard mode selection switch 70 and an input signal selection switch 73 are provided on a front panel of the VTR. As will be described later, the standard mode selection switch 70 is used to select the standard mode, and the input signal selection switch 73 is used to select the input signal.

The pin 18 is coupled to a cassette discriminating circuit 23 shown in FIG. 1. The cassette discriminating circuit 23 produces a low-level cassette discrimination signal indicating that the loaded tape cassette is the standard tape cassette 11 when the pin 18 is in the lowered position, and produces a high-level cassette discrimination signal indicating that the loaded tape cassette is the high performance tape cassette 17 when the pin 18 is in the raised position.

Normally, the standard mode selection switch 70 shown in FIG. 1 produces a low-level signal which is inverted into a high-level signal in an inverter 71 and is supplied to an AND circuit 72. The standard mode selection switch 70 is manipulated when the user wishes to set the mode of the VTR to the standard mode even though the high performance tape cassette 17 is loaded into the VTR. Accordingly, when the standard tape cassette 11 is loaded into the cassette loading part of the VTR shown in FIG. 2, the AND circuit 72 produces a low-level signal which is supplied to a switch 24, and the switch 24 is connected to a terminal A thereof so as to select the standard mode. On the other hand, when the high performance tape cassette 17 is loaded into the cassette loading part of the VTR, the AND circuit 72 produces a high-level signal which is supplied to the switch 24, and the switch 24 is connected to a terminal B thereof so as to select the high quality mode. However, when the standard mode selection switch 70 is manipulated in this state, a high-level signal is produced from the standard mode selection switch 70, and a low-level signal from the inverter 71 is supplied to the AND circuit 72 thereby connecting the switch 24 to the terminal A so as to select the standard mode.

Therefore, the mode of the VTR is automatically set to the appropriate recording mode by simply loading the different kinds of tape cassettes into the loading part of the VTR. Because the hole 16a is formed in the portion of the groove 16, dust particles and the like are prevented from easily entering into the high performance tape cassette 17 via the hole 16a by the stepped parts of the groove 16. In the case of the VTR provided with a cassette holder (not shown) which lowers the loaded tape cassette to the cassette loading part, the pin 18 engages the hole 16a of the high performance tapes cassette 17 as the cassette holder is moves downwardly, and the stepped parts of the groove 16 and the groove 16 itself act as guides for guiding the pin 18 to ensure positive engagement between the pin 18 and the hole 16a. Further, when the high performance tape cassette 17 is loaded into the VTR, it is possible to freely select the high quality mode or the standard mode by appropriately manipulating the standard mode selection switch 70.

Next, a description will be given on the recording operation by use of the carrier frequency dependent on the selected mode. In FIG. 1, the input signal selection switch 73 is connected to terminals a when selecting an input composite video signal, and is connected to terminals b when selecting input separate luminance and carrier chrominance signals. For example, a composite video signal applied to a terminal 19 is passed through the input signal selection switch 73 connected to the terminals a and is supplied to lowpass and comb filters 20a and 20b and to a bandpass filter 26. For example, the lowpass and comb filter 20a has a cutoff frequency in the order of 3 MHz, and the lowpass and comb filter 20b has a cutoff frequency in the order of 5 MHz. An output luminance signal component of the lowpass and comb filter 20a is passed through a pre-emphasis circuit 21a and a frequency modulator 22a and is supplied to the terminal A of the switch 24. As will be described later, the frequency modulator 22a carries out a frequency modulation with the carrier frequency of 3.4 MHz to 4.4 MHz. On the other hand, an output luminance signal component of the lowpass and comb filter 20b is passed through a pre-emphasis circuit 21b and a frequency modulator 22b and is supplied to the terminal B of the switch 24. As will be described later, the frequency modulator 22b carries out a frequency modulation with the carrier frequency of 5.0 MHz to 6.7 MHz. Hence, a frequency modulated (FM) luminance signal in the standard mode from the frequency modulator 22a or an FM luminance signal in the high quality mode from the frequency modulator 22b is supplied to an adder 25 depending on the connection of the switch 24.

Figure 5:
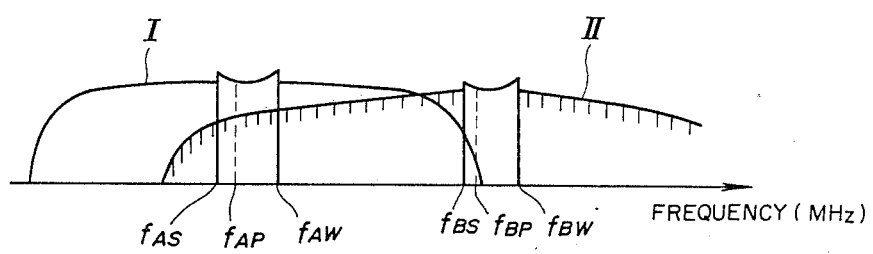
FIG. 5 show frequency spectrums of FM luminance signals in standard and high quality modes.

The frequency spectrum of the FM luminance signal in the standard mode is indicated by a spectrum I in FIG. 5, and the frequency spectrum of the FM luminance signal in the high quality mode is indicated by a spectrum II in FIG. 5. As may be seen from FIG. 5, the carrier frequency of the FM luminance signal in the high quality mode is set to a frequency higher than the carrier frequency of the FM luminance signal in the standard mode. In addition, the carrier frequency deviation of the FM luminance signal in the high quality mode is set wider than the carrier frequency deviation of the FM luminance signal in the standard mode.

Figure 6:
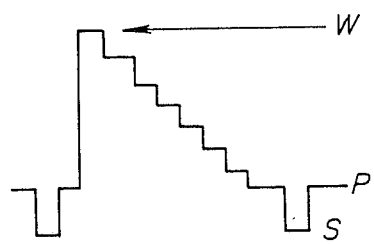
FIG. 6 show a synchronizing tip level, a pedestal level and a white peak level of the luminance signal.

In the frequency spectrum I of the FM luminance signal in the standard mode, $f_{AS}$, $f_{AP}$ and $f_{AW}$ respectively denote the carrier frequency at a synchronizing tip level S, a pedestal level P and a white peak level W of the luminance signal shown in FIG. 6. Similarly, in the frequency spectrum II of the FM luminance signal in the high quality mode, $f_{BS}$, $f_{BP}$ and $f_{BW}$ respectively denote the carrier frequency at the synchronizing tip level S, the pedestal level P and the white peak level W of the luminance signal shown in FIG. 6. For example, the carrier frequencies $f_{AS}$, $f_{AP}$ and $f_{AW}$ in the standard mode respectively are 3.4 MHz, 3.8 MHz and 4.4 MHz, and the carrier frequencies $f_{BS}$, $f_{BP}$ and $f_{BW}$ in the high quality mode respectively are 5.0 MHz, 5.6 MHz and 6.7 MHz.

As may be seen from FIG. 5, the frequency component in the sideband of the FM luminance signal in the other mode also exists at the carrier frequencies $f_{AP}$ and $f_{BP}$ corresponding to the pedestal level. However, the energy at the carrier frequency $f_{AP}$ or $f_{BP}$ is sufficiently large compared to the energy of the frequency component in the sideband of the FM luminance signal in the other mode. Hence, in the present embodiment, the mode with which the tape was recorded at the time of the recording is discriminated in the reproducing mode by noting on this point.

On the other hand, the input composite video signal supplied to the bandpass filter 26 is converted into a carrier chrominance signal, and this carrier chrominance signal is supplied to the adder 25 via a carrier chrominance signal processing circuit 27 which subjects the carrier chrominance signal to a predetermined signal processing such as to a frequency conversion to a frequency band lower than the frequency band of the corresponding FM luminance signal. Hence, the FM luminance and the frequency converted carrier chrominance signal are added into a frequency division multiplexed signal in the adder 25, and this frequency division multiplexed signal from the adder 25 is supplied to rotary magnetic heads $29_1$ and $29_2$ as a recording signal via a recording amplifier 28. The heads $29_1$ and $29_2$ alternately record the recording signal on successive oblique tracks of a magnetic tape 30.

When the input separate luminance signal and the carrier chrominance signal are applied to terminals $19_Y$ and $19_C$, respectively, and the input signal selection switch 73 is connected to the terminals b, the luminance signal and the carrier chrominance signal are processed similarly to the composite video signal described before.

The recording amplifier 28 may be constructed so that the characteristic and magnitude of the recording current are varied to match the characteristic of the magnetic tape which is used. For example, it is possible to provide a recording amplifier (not shown) having a characteristic matched to the standard tape and another recording amplifier (not shown) having a characteristic matched to the high performance tape, and selectively use the appropriate recording amplifier responsive to the output signal of the AND circuit 72.

In the embodiment of the high performance tape cassette described heretofore, the discrimination from the standard type tape cassette is carried out by use of the hole 16a. However, it is possible to discriminate the high performance tape cassette from the standard tape cassette by use of a bar code which is provided on the high performance tape cassette as the cassette discriminating part.

Figure 7:
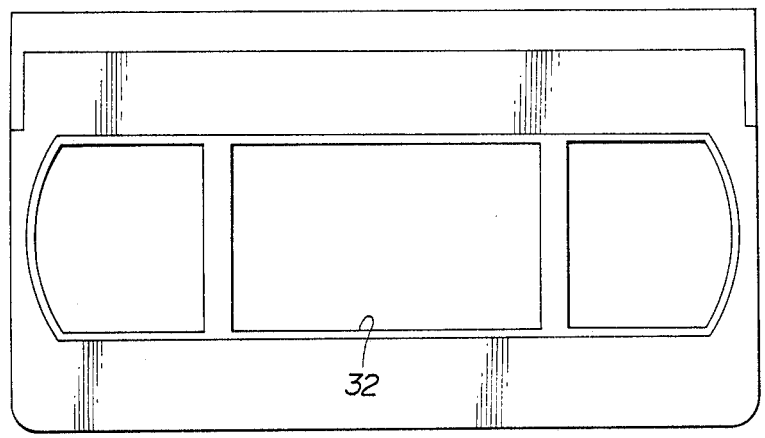
FIG. 7 is a plan view showing the standard tape cassette.
Figure 8:
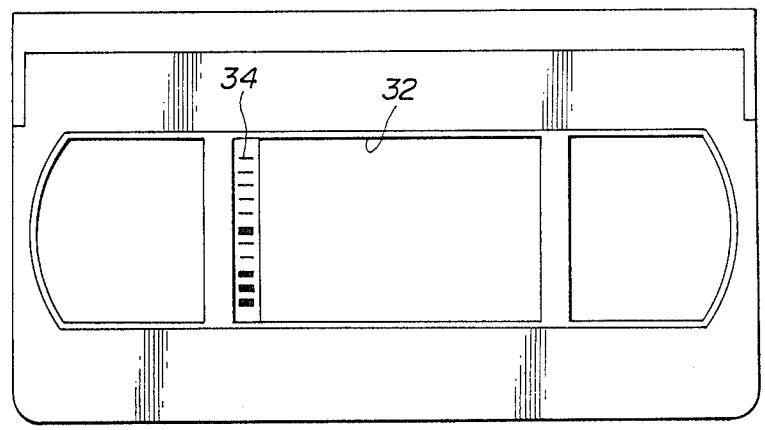
FIG. 8 is a plan view showing another embodiment of the high performance tape cassette.

FIG. 7 shows the plan view of the standard tape cassette 11, and FIG. 8 shows the plan view of another embodiment of the high performance tape cassette. In FIG. 7, the standard tape cassette 11 comprises a depression 32 on a top thereof. However, no bar code is provided in the depression 32 of the standard tape cassette 11. On the other hand, a bar code 34 is provided in the depression 32 of a high performance tape cassette 33 shown in FIG. 8.

Figure 9:
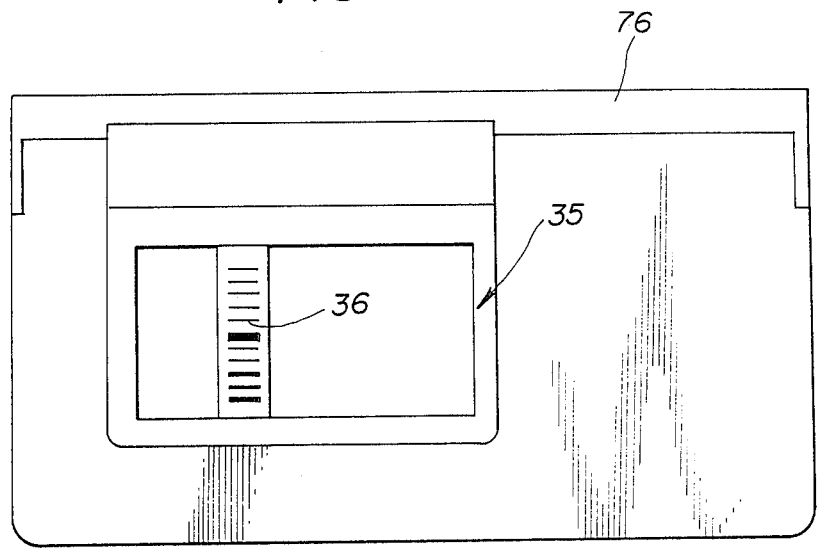
FIG. 9 is a plan view showing an embodiment of a high performance miniature type tape cassette accommodated within a tape cassette adapter.
Figure 13A:
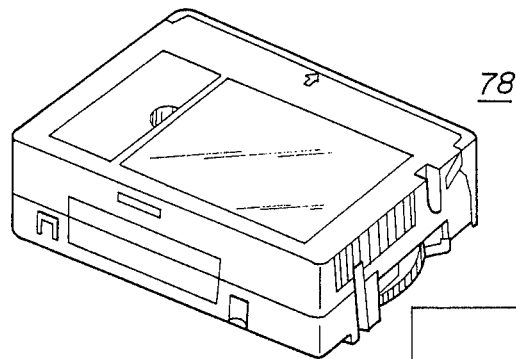
FIGS. 13A and 13B are a perspective view and a rear view respectively showing a standard miniature type tape cassette.
Figure 13B:
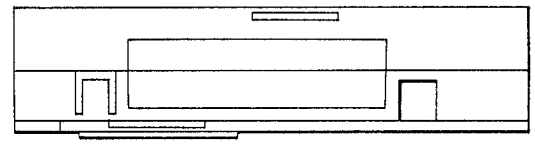

FIG. 9 shows an embodiment of a high performance miniature type tape cassette which accommodates a high performance tape. A high performance miniature type tape cassette 35 comprises a bar code 36 on the top thereof. As shown in FIGS. 13A and 13B, a standard miniature type tape cassette 78 which accommodates a standard tape has no bar code provided on the top thereof. The external form and size of the miniature type tape cassettes 35 and 78 are approximately the same. The miniature type tape cassette 35 or 78 is accommodated within a tape cassette adapter 76 having an external form and size approximately the same as those of the standard tape cassette 11. When playing the miniature type tape cassette 35 or 78, the miniature type tape cassette 35 or 78 is loaded into the VTR in a state accommodated within the tape cassette adapter 76.

Figure 12:
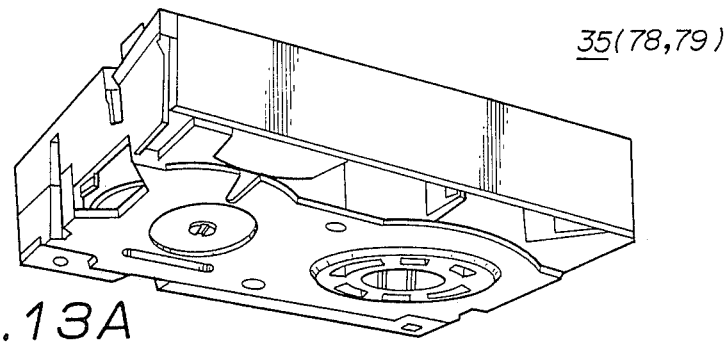
FIG. 12 is a perspective view showing a miniature type tape cassette from a bottom thereof.

FIG. 12 is a perspective view from the bottom of the miniature type tape cassette 35 or 78.

Figure 10:
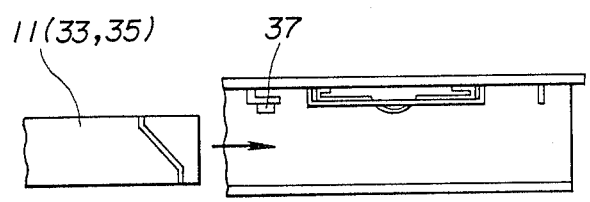
FIGS. 10 and 11 are a side view and a perspective view respectively showing an embodiment of a bar code detector of the magnetic recording and/or reproducing apparatus together with a portion of the tape cassette.
Figure 11:
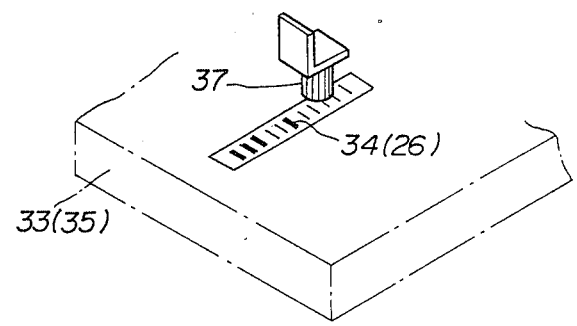

A bar code detector (optical sensor) 37 shown in FIGS. 10 and 11 is provided at a predetermined position of the VTR so as to confront the bar code 34 or 36 when the high performance tape cassette 33 or the miniature type tape cassette 35 accommodated within the tape cassette adapter 76 is loaded into the cassette loading part of the VTR. This bar code sensor 37 is coupled to the cassette discriminating circuit 23 shown in FIG. 1. In the case of a VTR (not shown) designed exclusively for playing the miniature type tape cassette, the bar code sensor 37 is provided at a predetermined position of this VTR so as to confront the bar code 36 when the high performance miniature type tape cassette 35 is loaded independently into the cassette loading part of this VTR.

When the standard tape cassette 11 is loaded into cassette loading part of the VTR, the bar code detector 37 does not produce an output detection signal (or produces a low-level detection signal), and the cassette discriminating circuit 23 produces the low-level cassette discrimination signal indicating that the loaded tape cassette is the standard tape cassette 11. Hence, the switch 24 shown in FIG. 1 is connected to the terminal A in this case. On the other hand, when the high performance tape cassette 33 or 35 is loaded into the cassette loading part of the VTR, the bar code detector 37 reads the bar code 34 or 36 and produces an output detection signal (or produces a high-level detection signal), and the cassette discriminating circuit 23 produces a high-level cassette discrimination signal indicating that the loaded tape cassette is the high performance tape cassette 33 or 35. Thus, in this case, the switch 24 is connected to the terminal B. Therefore, as in the case of the embodiment described before, the mode of the VTR is automatically set to the appropriate recording mode by simply loading the different kinds of tape cassettes into the loading part of the VTR, and there is no need for the user to visually discriminate the kind of the loaded tape cassette.

Figure 14A:
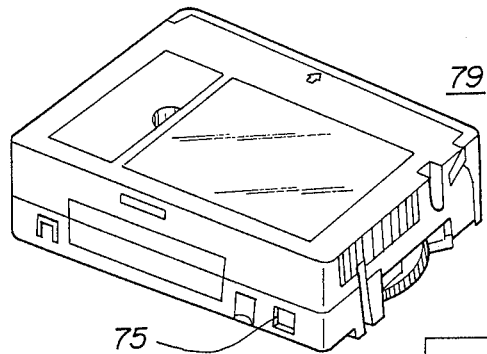
FIGS. 14A and 14B are a perspective view and a rear view respectively showing another embodiment of the high performance miniature type tape cassette.
Figure 14B:
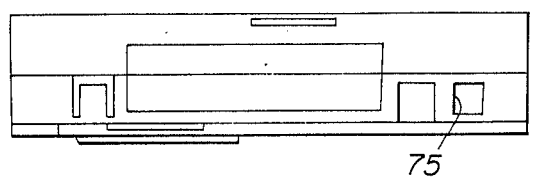

FIGS. 14A and 14B are a perspective view and a rear view respectively showing another embodiment of the high performance miniature type tape cassette. A high performance miniature type tape cassette 79 accommodates a high performance tape and is provided with a hole 75 which is used to discriminate the high performance miniature type tape cassette 79 from the standard miniature type tape cassette. The perspective view from the bottom of the miniature type tape cassette 79 is identical to that shown in FIG. 12. In the case of a VTR (not shown) designed exclusively for playing the miniature type tape cassette, a detecting means comprising a leaf spring or the like is provided at a predetermined position of this VTR so as to confront the hole 75 when the high performance miniature type tape cassette 79 is loaded independently into the cassette loading part of this VTR, and the high performance miniature type tape cassette 79 can be discriminated from the standard miniature type tape cassette 78 shown in FIGS. 13A and 13B similarly as in the case of the pin 18 described before.

Figure 15A:
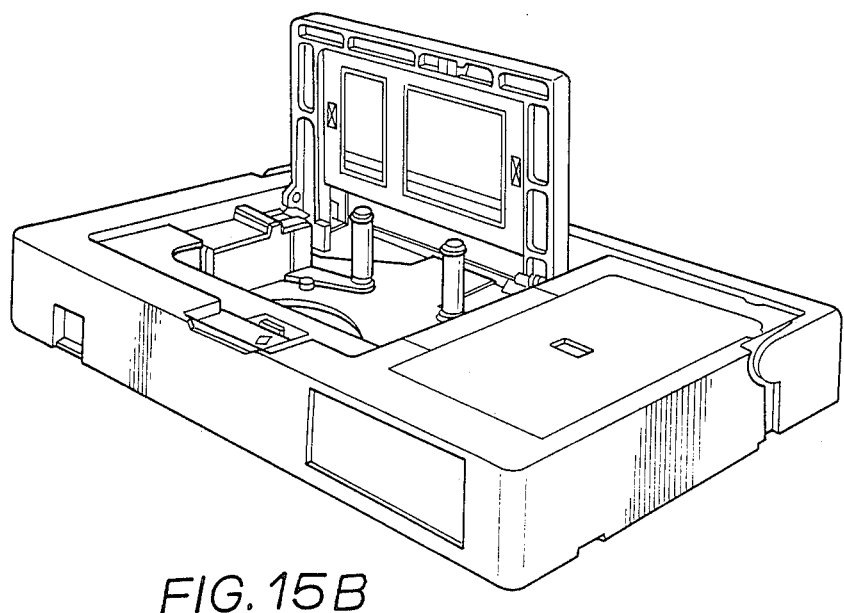
FIGS. 15A and 15B are perspective views respectively showing a tape cassette adapter from top and bottom thereof.
Figure 15B:
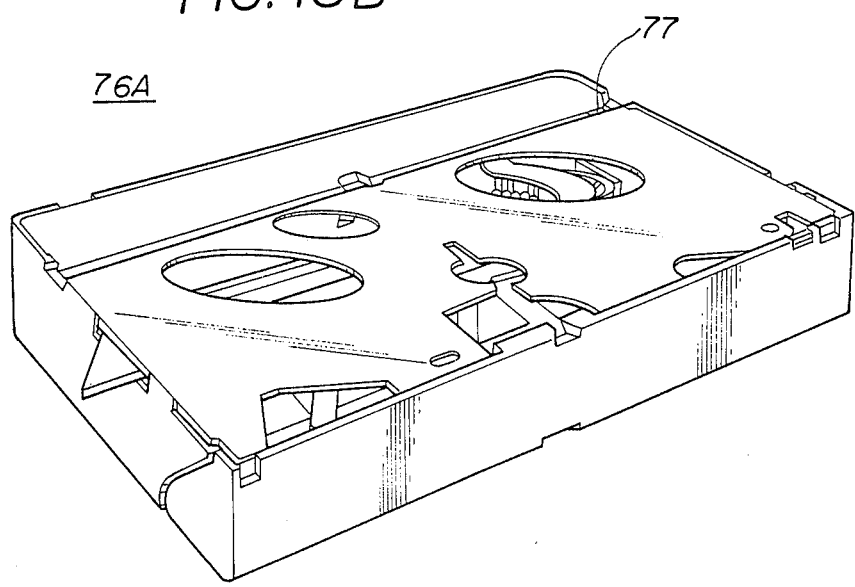

But when playing the miniature type tape cassette 78 or 79 on the VTR which is designed to play the standardized tape cassette shown in FIGS. 3, 4, 7 and 8, the miniature type tape cassette 78 or 79 is loaded into the VTR in a state accommodated within a tape cassette adapter 76A shown in FIGS. 15A and 15B. The tape cassette adapter 76A is designed so that when the standard miniature type tape cassette 78 is accommodated within the tape cassette adapter 76A, a hole 77 which is provided in the bottom of the tape cassette adapter 76A as shown in FIG. 15B for discriminating the kind of miniature type tape cassette accommodated within the tape cassette adapter 76A is closed, but the hole 77 is open when the high performance miniature type tape cassette 79 is accommodated within the tape cassette adapter 76A. The hole 77 is formed at a corresponding position to the hole 16a of the high performance tape cassette 17 shown in FIG. 4. Accordingly, the kind of miniature type tape cassette accommodated within the tape cassette adapter 76A which is loaded into the cassette loading part of the VTR may be discriminated by detecting the closed and open states of the hole 77 at the bottom of the tape cassette adapter 76A by use of the pin 18 described before.

Next, a description will be given on the operation of the VTR in the reproducing mode. The frequency division multiplexed signal of the FM luminance signal and the frequency converted carrier chrominance signal recorded on the tape 30 is alternately reproduced by the heads $29_1$ and $29_2$. The reproduced signal from the head $19_1$ is passed through a pre-amplifier $38_1$ and is supplied to a switch 39, and the reproduced signal from the head $19_2$ is passed through a pre-amplifier $38_2$ and is supplied to the switch 39. A head switching pulse signal having a period of two fields is applied to a terminal 40 and controls the switching of the switch 39 so that a continuous reproduced signal is obtained from the switch 39.

The continuous reproduced signal from the switch 39 is supplied to a highpass filter 41 and a lowpass filter 42. A reproduced FM luminance signal is obtained from the highpass filter 41 and is supplied to equalizer circuits 43a and 43b. The equalizer circuit 43a is provided for the standard mode and an output signal thereof is supplied to a terminal A of a switch 44. On the other hand, the equalizer circuit 43b is provided for the high quality mode and an output signal thereof is supplied to a terminal B of the switch 44. An output signal of the switch 44 is passed through an automatic gain control (AGC) circuit 45 and is supplied to a limiter 46 and to a mode discriminating circuit 47.

The limiter 46 eliminates the amplitude deviation component of the reproduced FM luminance signal. The output reproduced FM luminance signal of the limiter 46 is passed through a frequency demodulator 48a, a lowpass filter 49a and a de-emphasis circuit 50a for the standard mode, and is supplied to a terminal A of a switch 51. Similarly, the output reproduced FM luminance signal of the limiter 46 is passed through a frequency demodulator 48b, a lowpass filter 49b and a de-emphasis circuit 50b for the high quality mode, and is supplied to a terminal B of the switch 51.

As will be described later, the mode discriminating circuit 47 automatically discriminates from the output signal of the AGC circuit 45 whether the tape 30 was recorded in the standard mode or the high quality mode, and produces a mode discrimination signal indicative of the discriminated result. This mode discrimination signal is supplied to a system controller 52 which is also supplied with the output cassette discrimination signal of the cassette discriminating circuit 23. The system controller 52 produces a switching pulse signal from the output signal of the cassette discriminating circuit 23 in the recording mode, and produces a switching pulse signal from the output mode discrimination signal of the cassette discriminating circuit 23 in the reproducing mode. The switching pulse signal produced from the system controller 52 is supplied to the switches 44 and 51 to control the connection thereof. As a result, the switches 44 and 41 are connected to the respective terminals A when the FM luminance signal is originally recorded in the standard mode and are connected to the respective terminals B when the FM luminance signal is originally recorded in the high quality mode.

The lowpass filter 42 separates the reproduced frequency converted carrier chrominance signal from the output reproduced signal of the switch 39, and supplies this reproduced frequency converted carrier chrominance signal to a carrier chrominance signal processing circuit 53. The carrier chrominance signal processing circuit 53 eliminates jitter and returns the reproduced frequency converted carrier chrominance signal back into a reproduced carrier chrominance signal in the original frequency band.

An adder 54 adds the reproduced carrier chrominance signal from the carrier chrominance signal processing circuit 53 and the reproduced (demodulated) luminance signal which is demodulated in accordance with the mode with which the recording of the FM luminance signal was originally made and is obtained from the switch 51. The adder 54 produces a reproduced color video signal which is supplied to an output terminal 55.

According to the needs, the reproduced carrier chrominance signal from the carrier chrominance signal processing circuit 53 may be passed through a driving amplifier $74_C$ and obtained via a terminal $55_C$, and the reproduced luminance signal from the switch 51 may be passed through a driving amplifier $74_Y$ and obtained via a terminal $55_Y$.

Figure 16:
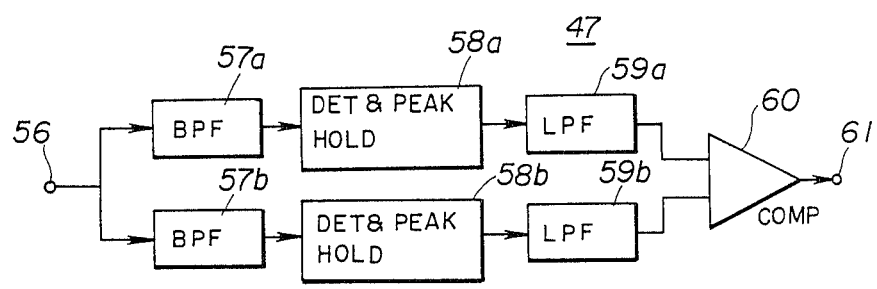
FIG. 16 is a system block diagram showing a first embodiment of a mode discriminating circuit in the block system shown in FIG. 1.
Figure 17:
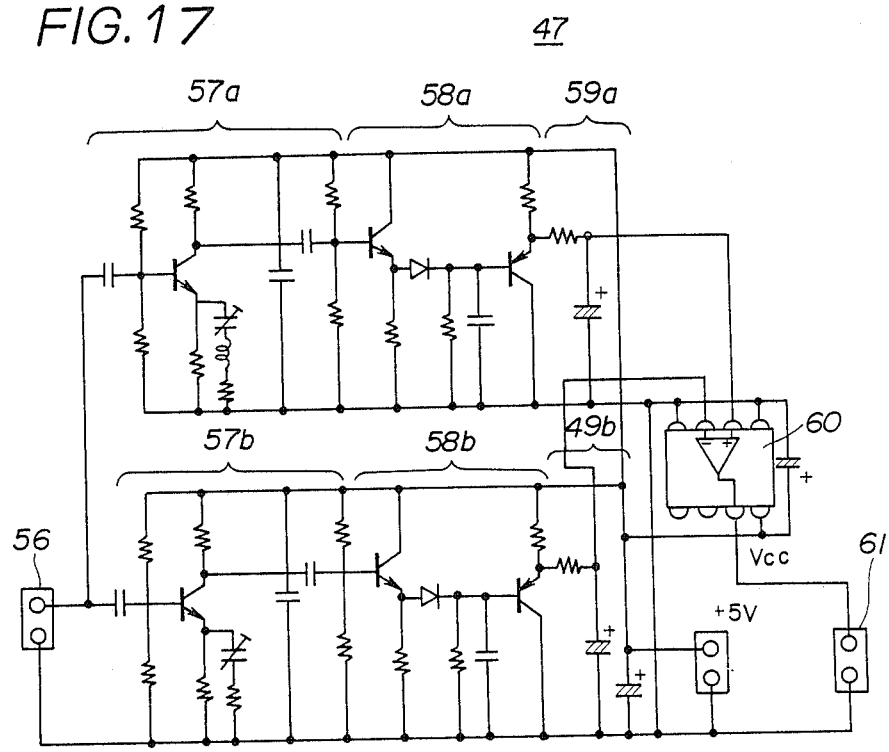
FIG. 17 is a circuit diagram showing the first embodiment of the mode discriminating circuit.

Next, a description will be given on the mode discriminating circuit 47. FIG. 16 shows a first embodiment of the mode discriminating circuit 47, and FIG. 17 shows the circuit construction of this first embodiment of the mode discriminating circuit 47. In FIGS. 16 and 17, the reproduced FM luminance signal from the AGC circuit 45 shown in FIG. 1 is applied to a terminal 56 and is supplied to bandpass filters 57a and 57b. The passband of the bandpass filter 57a is set in a vicinity of the carrier frequency $f_{AP}$ shown in FIG. 5 for the standard mode and forms the reproduced FM luminance signal into a narrow frequency band signal. Similarly, the passband of the bandpass filter 57b is set in a vicinity of the carrier frequency $f_{BP}$ shown in FIG. 5 for the high quality mode and forms the reproduced FM luminance signal into a narrow frequency band signal. The narrow frequency band signal from the bandpass filter 57a has a level greater than that from the bandpass filter 57b when the FM luminance signal is originally recorded in the standard mode, but the narrow frequency band signal from the bandpass filter 57b has a level greater than that from the bandpass filter 57a when the FM luminance signal is originally recorded in the high quality mode. The narrow frequency band signal from the bandpass filter 57a is passed through a detector and peak hold circuit 58a wherein peaks are held, and is supplied to a lowpass filter 59a which eliminates an unwanted frequency component and produces a D.C. signal. The narrow frequency band signal from the bandpass filter 57b is passed through a detector and peak hold circuit 58b wherein peaks are held, and is supplied to a lowpass filter 59b which eliminates an unwanted frequency component and produces a D.C. signal. The provision of these lowpass filters 59a and 59b prevents an erroneous operation at portions where the FM signal is missing due to a noise bar and the like generated during a search or still reproduction mode of the VTR.

The output D.C. signals of the lowpass filters 59a and 59b are supplied to a comparator 60 which compares the levels of the two D.C. signals. The comparator 60 produces an error signal indicative of the mode with which the recording was made on the tape 30 at the time of the recording, and this error signal is passed through an output terminal 61 and is supplied to the system controller 52 shown in FIG. 1 as the mode discrimination signal. The mode discrimination signal from the comparator 60 has a first logic level when the FM luminance signal is originally recorded in the standard mode and has a second logic level when the FM luminance signal is originally recorded in the high quality mode.

When the output D.C. signals of the lowpass filters 59a and 59b have approximately the same levels and the levels are unstable due to noise and the like, a chattering is generated in the output error signal of the comparator 60. In this case, the comparator 60 may be designed to have a hysteresis characteristic so as to prevent this chattering.

Figure 18:
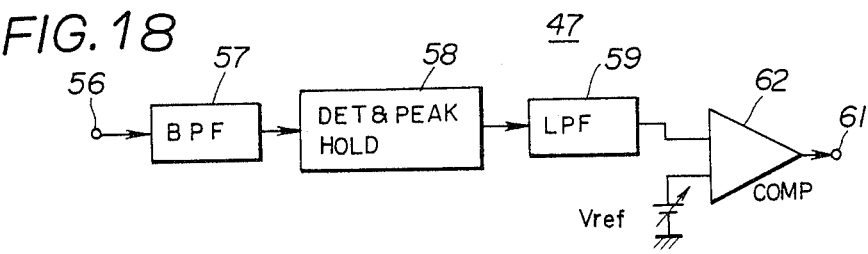
FIG. 18 is a system block diagram showing a second embodiment of the mode discriminating circuit.

FIG. 18 shows a second embodiment of the mode discriminating circuit 47. In FIG. 18, those parts which are the same as those corresponding parts in FIG. 16 are designated by the same reference numerals with the subscript omitted, and a description thereof will be omitted. In the present embodiment, the level of the D.C signal from the lowpass filter 59 is compared with a reference volta $V_{REF}$ in a comparator 62. The comparator 62 produces an error signal indicative of the mode with which the recording was made on the tape 30 at the time of the recording, and this error signal is passed through the output terminal 61 and is supplied to the system controller 52 shown in FIG. 1 as the mode discrimination signal.

In the first and second embodiments of the mode discriminating circuit 47, the peak holding operations of the detector and peak hold circuits 58a, 58b and 58 are less affected during the video signal interval (hereinafter simply referred to as video interval) as the time constants thereof become longer. In other words, when a peak hold circuit part holds a peak, the held value inevitably decreases with a certain time constant due to the circuit construction thereof. For this reason, if the time constant of the peak hold circuit part were short, the peak held during the pedestal level will greatly decrease during the video interval. But on the other hand, when the time constants of the detector and peak hold circuits 58a, 58b and 58 become longer and the amplitude of the extracted FM signal greatly varies due to noise and the like, it takes a long recovery time when the outputs of the comparators 60 and 62 become inverted. For these reasons, the time constants of the detector and peak hold circuits 58a, 58b and 58 should be set to an optimum value such as one second so that the adverse effects during the video interval are avoided and a short recovery time is ensured.

Figure 19:
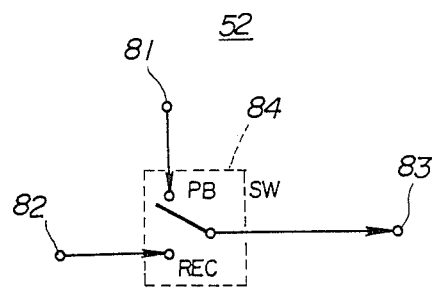
FIG. 19 is a system circuit diagram showing an embodiment of a system controller in the block system show in FIG. 1.

FIG. 19 shows an embodiment of the system controller 52 shown in FIG. 1. In FIG. 19, the system controller 52 is constituted by a switch 84 which is connected to a terminal REC in the recording mode and is connected to a terminal PB in the reproducing mode. The mode discrimination signal from the mode discriminating circuit 47 shown in FIG. 1 is applied to a terminal 81, and the output cassette discrimination signal of the cassette discriminating circuit 23 shown in FIG. 1 is applied to the terminal 82. Thus, the system controller 52 produces as the switching pulse signal the output signal of the cassette discriminating circuit 23 in the recording mode and produces as the switching pulse signal the output mode discrimination signal of the mode discriminating circuit 47 in the reproducing mode, and supplies the switching pulse signal to the switches 44 and 51 shown in FIG. 1 via an output terminal 83.

In the embodiment shown in FIG. 19, the output cassette discrimination signal of the cassette discriminating circuit 47 is not used in the reproducing mode. However, it is possible to employ a system controller which controls the switches 44 and 51 based on the output cassette discrimination signal of the cassette discriminating circuit 47 and the output mode discrimination signal of the mode discriminating circuit 47 in the reproducing mode. In this case, it is possible to more positively discriminate the mode with which the tape 30 was recorded at the time of the recording.

When playing the standard tape cassette on the VTR in the recording mode, the mode of the VTR is automatically set to the standard mode and cannot be set to the high quality mode, by the operation of the cassette discriminating circuit 23 and the AND circuit 72 shown in FIG. 1. On the other hand, when playing the high performance tape on the VTR in the recording mode, the mode of the VTR is automatically set to the high quality mode, but the mode can be switched manually to the standard mode by manipulating the standard mode selection switch 70.

When playing the high performance tape cassette on the VTR in the reproducing mode, it is insufficient to simply discriminate the kind of tape cassette by the cassette discriminating circuit 23, because the high performance tape cassette may have been recorded in the standard mode. But according to the embodiment described heretofore, the mode discriminating circuit 47 discriminates the mode with which the tape was recorded at the time of the recording based on the reproduced signal from the tape. Thus, in the reproducing mode, the mode of the VTR is automatically set to the standard mode when the tape was recorded in the standard mode at the time of the recording and is automatically set to the high quality mode when the tape was recorded in the high quality mode. On the other hand, when playing the standard tape cassette on the VTR in the reproducing mode, the mode of the VTR is automatically set to the standard mode and cannot be set to the high quality mode.

Figure 21:
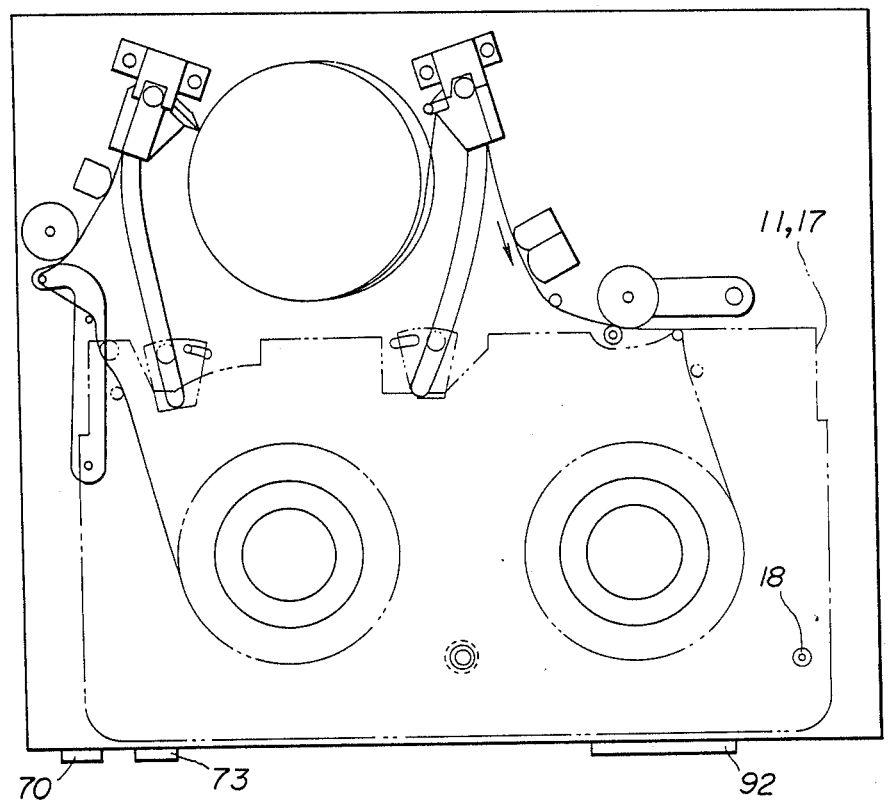
FIG. 21 is a plan view generally showing the second embodiment of the magnetic recording and/or reproducing apparatus.
Figure 20:
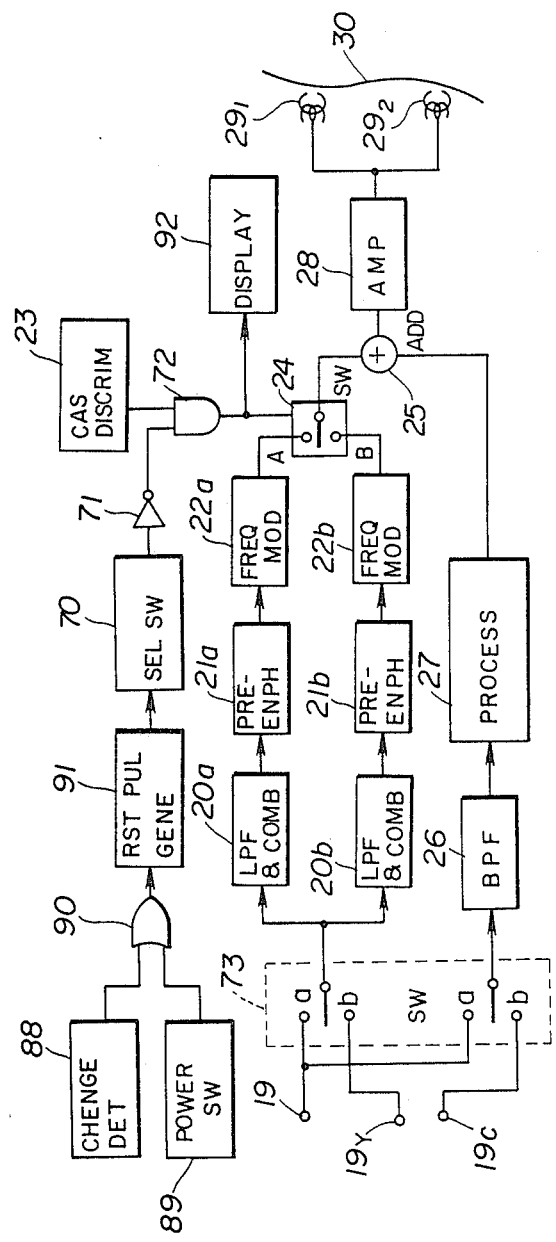
FIG. 20 is a system block diagram showing an essential part of a second embodiment of the magnetic recording and/or reproducing apparatus according to the present invention.

Next, a description will be given on a second embodiment of the VTR according to the present invention. FIG. 20 shows the second embodiment of the VTR, and FIG. 21 generally shows the plan view of the second embodiment. In FIG. 20, those parts which are the same as those corresponding parts in FIG. 1 are designated by the same reference numerals, and a description thereof will be omitted. Further, the illustration of the reproducing system of the VTR is omitted in FIG. 20. In FIG. 21, those parts which are the same as those corresponding parts in FIG. 2 are designated by the same reference numerals, and a description thereof will be omitted. For convenience sake, it will be assumed in the present embodiment that either the standard tape cassette 11 or the high quality tape cassette 17 described before is played on the VTR.

The present embodiment is additionally provided with a cassette change detecting circuit 88 for detecting the changing of the loaded tape cassette, a power source switch 89, an OR circuit 90, a switch reset pulse generating circuit 91 for generating a switch reset pulse which resets the standard mode selection switch 70, and a recording mode display device 92 shown in FIGS. 20 and 21.

When the standard tape cassette 11 is loaded into the cassette loading part of the VTR shown in FIG. 21, the output signal of the cassette discriminating circuit 23 has a low level, the output signal of the AND circuit 72 has a low level and the switch 24 is connected to the terminal A. In this case, the recording mode display device 92 displays the standard recording mode responsive to the low-level signal from the AND circuit 71. In this state, the display on the recording mode display device 92 will not change even when the standard mode selection switch 70 is manipulated, because the output signal level of the cassette discriminating circuit 23 is low.

On the other hand, when the high performance tape cassette 17 is loaded into the cassette loading part of the VTR, the output signal of the cassette discriminating circuit 23 has a high level, the output signal of the AND circuit 72 has a high level and the switch 24 is connected to the terminal B. In this case, the recording mode display device 92 displays the high quality recording mode responsive to the high-level signal from the AND circuit 71. In this state, the display on the recording mode display device 92 changes to the standard recording mode when the standard mode selection switch 70 is manipulated, because the output signal level of the cassette discriminating circuit 23 is high and a low-level signal is obtained from the inverter 71.

After the standard mode selection switch 70 is manipulated, the standard mode selection switch 70 continues to output a high-level signal unless the standard mode selection switch 70 is manipulated again. For this reason, when the recording with respect to the loaded high performance tape cassette 17 in the standard recording mode is finished and another high performance tape cassette is loaded in place of the high performance tape cassette 17, the recording with respect to this other high performance tape cassette will also be carried out in the standard recording mode. But in most cases, the recording with respect to the high performance tape cassette is carried out in the high quality recording mode. The accidental recording with respect to the high performance tape cassette in the standard recording mode in the case where the recording should be carried out in the high quality recording mode may be prevented if the user confirms the state of the standard mode selection switch 70 and resets the standard mode selection switch 70 if necessary every time the high performance tape cassette is loaded into the VTR. However, the operation of confirming and resetting the standard mode selection switch 70 is troublesome to perform and is a burden on the user.

Accordingly, in order to eliminate the problem of the first embodiment, the present embodiment comprises means for automatically resetting the standard mode selection switch 70 when it is detected that the loaded tape cassette has been replaced or the power source switch 89 has been turned ON.

The cassette change detecting circuit 88 produces a high-level signal when the loaded tape cassette is changed (replaced). The OR circuit 90 is supplied with the output signals of the cassette change detecting circuit 88 and the power source switch 89, and supplies an output signal to the switch reset pulse generating circuit 91. The switch reset pulse generating circuit 91 generates a switch reset pulse only when a high-level signal is received from the OR circuit 90, and the switch reset pulse resets the standard mode selection switch 70. As a result, every time the loaded tape cassette is replaced or the power source switch 89 is turned ON, the standard mode selection switch 70 is reset so that the standard mode selection switch 70 outputs a low-level signal and the recording mode of the VTR is automatically set to the high quality recording mode in the case where the loaded tape cassette is the high performance tape cassette 17.

Figure 22:
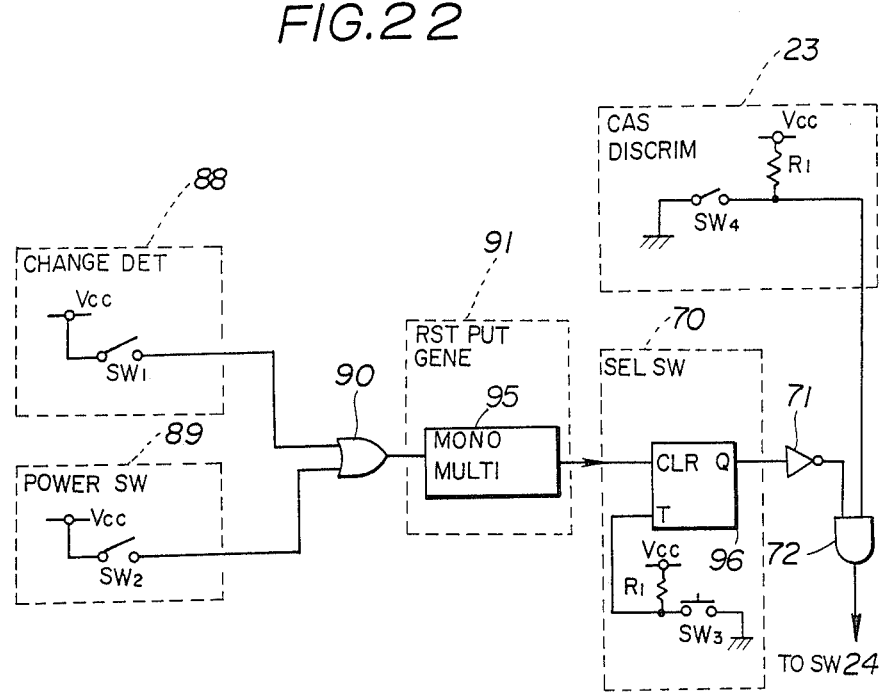
FIG. 22 is a system circuit diagram showing an embodiment of an essential part of the block system shown in FIG. 20.

FIG. 22 shows an embodiment of an essential part of the block system shown in FIG. 20. In FIG. 22, those parts which are the same as those corresponding parts in FIG. 20 are designated by the same reference numerals and Vcc denotes a power source voltage. The cassette change detecting circuit 88 comprises a switch SW1, the power source switch 89 comprises a switch SW2, and the cassette discriminating circuit 23 comprises a resistor R2 and a switch SW4. The switch reset pulse generating circuit 91 comprises a monostable multivibrator 95. The standard mode selection switch 70 comprises a trigger flip-flop 96, a resistor R1 and a normally open switch SW3. An output signal of the monostable multivibrator 95 is applied to a clear terminal CLR of the flip-flop 96. The resistor R1 has a first terminal connected to the power source voltage Vcc and a second terminal connected to a trigger terminal T of the flip-flop 96 and to a terminal of the switch SW3. Another terminal of the switch SW3 is grounded.

The switch SW1 of the cassette change detecting circuit 88 is provided on the cassette holder, for example, and closes to output a high-level signal (Vcc) when the tape cassette is inserted into the cassette holder. The monostable multivibrator 95 of the switch reset pulse generating circuit 91 generates a switch reset pulse having a pulse width sufficiently wide to clear the flip-flop 96 of the standard mode selection switch 70 every time the loaded tape cassette is replaced or the power source switch 89 is turned ON (that is, the switch SW1 or SW2 is closed). The switch SW4 of the cassette discriminating circuit 23 is open so as to output a high-level signal when the high performance tape cassette is loaded and is closed so as to output a low-level signal when the standard tape cassette is loaded.

A Q-output of the flip-flop 96 supplied to the inverter 61 is inverted every time the signal level at the trigger terminal T changes from the high level to the low level. But the Q-output of the flip-flop 96 does not change when the signal level at the trigger terminal T changes from the low level to the high level. The Q-output of the flip-flop 96 becomes low when the pulse applied to the clear terminal CLR has a sufficiently wide pulse width. As a result, the output signal level of the standard mode selection switch 70 undergoes a transition from the high level to the low level or vice versa every time the switch SW3 is pushed.

It is of course possible to modify the present embodiment so that the standard mode selection switch 70 is reset every time the loaded tape cassette is replaced or the power source switch 89 is turned OFF. In addition, the recording mode display device 92 may be omitted in the case where a switch having a display function is used for the standard mode selection switch 70.

Figure 23:
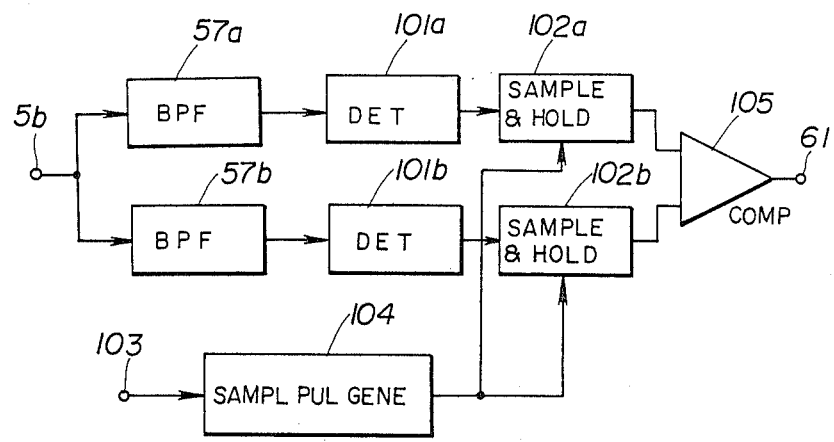
FIG. 23 is a system block diagram for explaining third and fourth embodiments of the mode discriminating circuit in the block, system shown in FIG. 1.

Next, a description will be given on a third embodiment of the mode discriminating circuit 47 by referring to FIG. 23. In FIG. 23, those parts which are essentially the same as those corresponding parts in FIG. 16 are designated by the same reference numerals, and a description thereof will be omitted. The passband of the bandpass filter 57a is set so that a center frequency of the passband is equal to the carrier frequency $f_{AP}$ shown in FIG. 5 for the standard mode and forms the reproduced FM luminance signal into a narrow frequency band signal. Similarly, the passband of the bandpass filter 57b is set so that a center frequency of the passband is equal to the carrier frequency $f_{BP}$ shown in FIG. 5 for the high quality mode and forms the reproduced FM luminance signal into a narrow frequency band signal. The narrow frequency band signal from the bandpass filter 57a is passed through a detector 101a wherein the envelope of the signal is detected, and an output envelope detection signal of the detector 101a is supplied to a sample and hold circuit 102a. The narrow frequency band signal from the bandpass filter 57b is passed through a detector 101b wherein the envelope of the signal is detected, and an output envelope detection signal of the detector 101b is supplied to a sample and hold circuit 102b.

On the other hand, the present embodiment of the mode discriminating circuit 47 is also supplied with the output reproduced luminance signal of the switch 51 as indicated by a phantom line in FIG. 1. The reproduced luminance signal from the switch 51 is applied to a terminal 103 and is supplied to a sampling pulse generating circuit 104. Based on the reproduced horizontal synchronizing signal, for example, the sampling pulse generating circuit 104 generates a sampling pulse signal which has a predetermined level only within the horizontal and vertical blanking periods excluding the synchronizing signal interval. The sampling pulse signal is simultaneously supplied to the sample and hold circuits 102a and 102b so as to sample and hold the signal level during the transmission interval of the pedestal level within the horizontal and vertical blanking periods excluding the synchronizing signal interval.

Accordingly, when the FM luminance signal is originally recorded in the standard mode, the output signal of the sample and hold circuit 102a has a large level because the output signal corresponds to the envelope detection signal during the transmission interval of the pedestal level at the carrier frequency corresponding to the pedestal level in the standard mode. On the other hand, the output signal of the sample and hold circuit 102b has a small level because the output signal corresponds to the envelope detection signal during the transmission interval of the pedestal level and is the detection signal of a sideband component of the reproduced FM luminance signal in the standard mode having a frequency equal to the carrier frequency corresponding to the pedestal level in the high quality mode. On the contrary, when the FM luminance signal is originally recorded in the high quality mode, the output signal of the sample and hold circuit 102a has a small level and the output signal of the sample and hold circuit 102b has a large level.

A comparator 105 compares the output signal levels of the sample and hold circuits 102a and 102b, and produces a signal having a first logic level when the FM luminance signal is originally recorded in the standard mode and having a second logic level when the FM luminance signal is originally recorded in the high quality mode.

The bandpass filters 57a and 57b filter and separate the FM luminance signal frequencies corresponding to the respective pedestal levels for the entire signal interval, and for this reason, the output signal levels of the detectors 101a and 101b during the video interval become lower than those during the blanking period. It is possible to construct the detectors 101a and 101b so that the undesirable effects of the lower output signal levels thereof during the video interval are minimized. But in this case, the response of the mode discriminating circuit 47 becomes slow when the recording carried out in the standard mode and the recording carried out in the high quality mode exist in adjacent regions of the same tape and the mode of the VTR must be changed, for example.

However, according to the present embodiment, the envelope detection signals are sampled and held only during the transmission interval of the pedestal level when the signals are stable, and the sampled and held signal levels are used for the level comparison in the comparator 105. Therefore, an accurate mode discrimination result is obtained from the level comparison, and the response of the mode discriminating circuit 47 is satisfactory.

It is evident that the output signals of the detectors 102a and 102b may be sampled and held during the transmission interval of the pedestal level within either one of the horizontal and vertical blanking periods excluding the synchronizing signal interval, instead of during the transmission interval of the pedestal level within both the horizontal and vertical blanking periods excluding the synchronizing signal interval.

Next, a description will be given on a fourth embodiment of the mode discriminating circuit 47 by referring to FIG. 23. In the present embodiment, the characteristics of the bandpass filters 57a and 57b and the timing of the sampling pulse signal generated from the sampling pulse generating circuit 104 are different from those in the third embodiment of the mode discriminating circuit 47 described before.

In the present embodiment, the passband of the bandpass filter 57a is set so that a center frequency of the passband is equal to the carrier frequency $f_{AS}$ shown in FIG. 5 for the standard mode and forms the reproduced FM luminance signal to a narrow frequency band signal. Similarly, the passband of the bandpass filter 57b is set so that a center frequency of the passband is equal to the carrier frequency $f_{BS}$ shown in FIG. 5 for the high quality mode and forms the reproduced FM luminance signal to a narrow frequency band signal. The narrow frequency band signal from the bandpass filter 57a has a level greater than that from the bandpass filter 57b when the FM luminance signal is originally recorded in the standard mode, but the narrow frequency band signal from the bandpass filter 57b has a level greater than that from the bandpass filter 57a when the FM luminance signal is originally recorded in the high quality mode.

The sampling pulse signal from the sampling pulse generating circuit 104 is simultaneously supplied to the sample and hold circuits 102a and 102b so as to sample and hold the signal level only during the transmission interval of the synchronizing tip level, that is, only during the synchronizing signal interval within the horizontal and vertical blanking periods.

Accordingly, when the FM luminance signal is originally recorded in the standard mode, the output signal of the sample and hold circuit 102a has a large level because the output signal corresponds to the envelope detection signal during the transmission interval of the synchronizing tip level at the carrier frequency corresponding to the synchronizing tip level in the standard mode. On the other hand, the output signal of the sample and hold circuit 102b has a small level because the output signal corresponds to the envelope detection signal during the transmission interval of the synchronizing tip level and is a sideband component of the reproduced FM luminance signal in the standard mode having the frequency equal to the carrier frequency corresponding to the synchronizing tip level in the high quality mode. On the contrary, when the FM luminance signal is originally recorded in the high quality mode, the output signal of the sample and hold circuit 102a has a small level and the output signal of the sample and hold circuit 102b has a large level.

The bandpass filters 57a and 57b filter and separate the FM luminance signal frequencies corresponding to the respective synchronizing tip levels for the entire signal interval, and for this reason, the output signal levels of the detectors 101a and 101b during the video interval become lower than those during the blanking period. It is possible to construct the detectors 101a and 101b so that the undesirable effects of the lower output signal levels thereof during the video interval are minimized. But in this case, the response of the mode discriminating circuit 47 becomes slow when the recording carried out in the standard mode and the recording carried out in the high quality mode exist in adjacent regions of the same tape and the mode of the VTR must be changed, for example.

However, according to the present embodiment, the envelope detection signals are sampled and held only during the transmission interval of the synchronizing tip level when the signals are stable, and the sampled and held signal levels are used for the level comparison in the comparator 105. Therefore, an accurate mode discrimination result is obtained from the level comparison, and the response of the mode discriminating circuit 47 is satisfactory.

It is evident that the output signals of the detectors 102a and 102b may be sampled and held during the transmission interval of the synchronizing tip level within either one of the horizontal and vertical blanking periods, instead of during the transmission interval of the synchronizing tip level within both the horizontal and vertical blanking periods.

Figure 24:
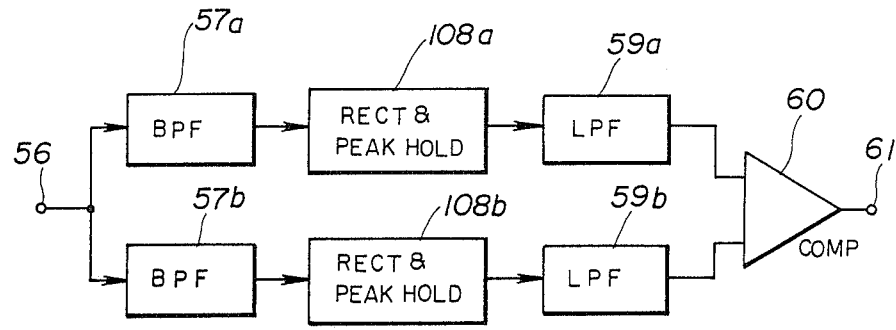
FIG. 24 is a system block diagram showing a fifth embodiment of the mode discriminating circuit in the block system shown in FIG. 1.

Next, a description will be given on a fifth embodiment of the mode discriminating circuit 47 by referring to FIG. 24. In FIG. 24, those parts which are essentially the same as those corresponding parts in FIG. 16 are designated by the same reference numerals, and a description thereof will be omitted. The passband of the bandpass filter 57a is set to a relatively wide passband including the carrier frequencies $f_{AP}$ and $f_{AS}$ shown in FIG. 5 for the standard mode. Similarly, the passband of the bandpass filter 57b is set to a relatively wide passband including the carrier frequencies $f_{BP}$ and $f_{BS}$ shown in FIG. 5 for the high quality mode.

A bandpass filter is generally constituted by coils, capacitors, resistors and the like and it is difficult to produce the bandpass filter in the form of an integrated circuit. Due to the inconsistencies in the characteristics of the elements constituting the bandpass filter, the manufacturing yield of the bandpass filter is poor when the passband is narrow. But according to the present embodiment, the bandpass filters used for the bandpass filters 57a and 57b are less affected by the inconsistencies in the characteristics of the elements constituting the bandpass filters because the passbands are relatively wide.

The sensitivity of the mode discriminating circuit 47 may decrease when the passbands of the bandpass filters 57a and 57b are set to relatively wide passbands, but when the carrier frequencies for the standard and high quality modes differ to a certain extent, it is possible to carry out a satisfactory mode discrimination by appropriately selecting the time constants of rectifier and peak hold circuits 108a and 108b provided in the subsequent stage. Hence, the sensitivity of the mode discriminating circuit 47 is virtually unaffected by the relatively wide passbands of the bandpass filters 57a and 57b.

Due to the selection of the respective passbands, the output signal level of the bandpass filter 57a is larger than that of the bandpass filter 57b when the FM luminance signal is originally recorded in the standard mode, and the output signal level of the bandpass filter 57b is larger than that of the bandpass filter 57a when the FM luminance signal is originally recorded in the high quality mode.

The signal from the bandpass filter 57a is supplied to the rectifier and peak hold circuit 108a wherein the signal is rectified and the peaks are held. Similarly, the signal from the bandpass filter 57b is supplied to the rectifier and peak hold circuit 108b wherein the signal is rectified and the peaks are held. The peak holding operation is less affected by the signal in the video interval when the tim constant becomes longer. But on the other hand, under such a condition where the FM signal has an amplitude greater than the actual amplitude due to noise and the like and the output signal of the comparator 60 is inverted as a result, it takes longer for the mode discriminating circuit 47 to be recover. Hence, the time constants of the rectifier and peak hold circuits 108a and 108b are selected appropriately by taking these two factors into consideration.

The output signals of the rectifier and peak hold circuits 108a and 108b are supplied to the respective lowpass filters 59a and 59b. During a special reproduction mode such as the search and still reproduction modes, each head scans across a plurality of oblique tracks on the tape 30 because the tape transport speed during the special reproduction mode is different from the tape transport speed at the time of the recording. When the head scans across a plurality of oblique tracks, the level of the reproduced signal from this head greatly decreases while the head scans a track which has been recorded by a head having a gap with an azimuth angle different from that of the scanning head. This great decrease in the reproduced signal level may cause the mode discriminating circuit 47 to carry out an erroneous operation, and the lowpass filters 59a and 59b are provided for the purpose of preventing such an erroneous operation from being carried out.

The lowpass filter 59a constitutes a detector together with the rectifier and peak hold circuit 108a, and the lowpass filter 59b constitutes another detector together with the rectifier and peak hold circuit 108b. The envelope detection signals from the lowpass filters 59a and 59b are supplied to the comparator 60 which compares the levels of the two envelope detection signals. The comparator 60 produces an error signal indicative of the mode with which the recording was made on the tape 30 at the time of the recording, and this error signal is passed through the output terminal 61 and is supplied to the system controller 52 shown in FIG. 1 as the mode discrimination signal. The mode discrimination signal from the comparator 60 has a first logic level when the FM luminance signal is originally recorded in the standard mode and has a second logic level when the FM luminance signal is originally recorded in the high quality mode.

When the output signals of the bandpass filters 57a and 57b have approximately the same levels and the levels are unstable due to noise and the like, a chattering is generated in the output error signal of the comparator 60. In other words, the output signal level of the comparator 60 changes between the first and second logic levels at a high speed. In this case, the comparator 60 may be designed to have a hysteresis characteristic so as to prevent this chattering.

It is evident that the output signals of the bandpass filters 57a and 57b may be sampled and held during the transmission interval of the synchronizing tip level and the pedestal level within either one of the horizontal and vertical blanking periods, instead of during the transmission interval of the synchronizing tip level and the pedestal level within both the horizontal and vertical blanking periods.

Figure 25:
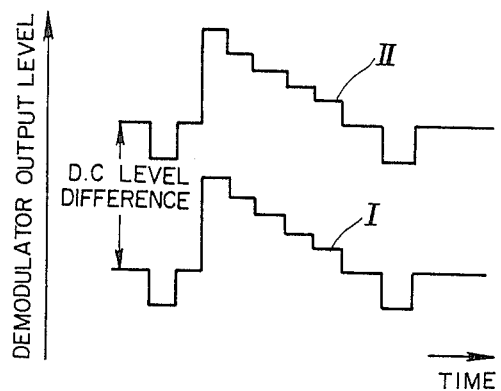
FIG. 25 is a diagram for explaining a sixth embodiment of the mode discriminating circuit in the block system shown in FIG. 1.

Next, a description will be given on a sixth embodiment of the mode discriminating circuit 47 by referring to FIGS. 25 through 27. When it is assumed that the carrier frequency of the signal recorded in the standard mode is 2 MHz lower than the carrier frequency of the signal recorded in the high quality mode, for example, the waveforms of the reproduced (demodulated) luminance signals for the standard and high quality modes become as indicated by waveforms I and II in FIG. 25, respectively. This is because, generally, a frequency demodulator has such a characteristic that an input frequency is proportional to an output signal level thereof. Hence, the difference in the carrier frequencies between the standard and high quality mode appears as a D.C. level difference between the two demodulated luminance signals. Accordingly, the present embodiment discriminates the mode by detecting the D.C. level difference.

Figure 26:
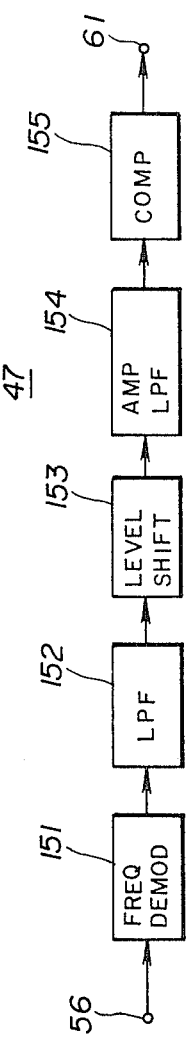
FIG. 26 is a system block diagram showing the sixth embodiment of the mode discriminating circuit.

In FIG. 26, the mode discriminating circuit 47 comprises a frequency demodulator 151, a lowpass filter 152, a level shift circuit 153, an amplifier and lowpass filter 154, and a comparator 155. The frequency demodulator 151 frequency-demodulates the reproduced FM luminance signal which is obtained from the AGC circuit 45 shown in FIG. 1 via the terminal 56. An output reproduced luminance signal of the frequency demodulator 151 is passed through the lowpass filter 152 wherein the carrier is eliminated, and the level shift circuit 153 shifts the level of an output signal of the lowpass filter 152 by a predetermined quantity. The amplifier and lowpass filter 154 amplifies the signal from the level shift circuit 153, and produces a signal corresponding to an average D.C. level of the reproduced luminance signal which is obtained by eliminating a noise component. The reproduced luminance signal from the amplifier and lowpass filter 154 is supplied to the comparator 155, and is compared with a predetermined reference value. The comparator 155 produces an error signal dependent on the level difference, and this error signal is outputted via the terminal 61 as the mode discrimination signal.

In the present embodiment, the D.C. level difference between the output signals obtained from the frequency demodulator 151 in the standard and high quality modes is 0.1 volts, for example, and is quite small. For this reason, the level shift circuit 153 and the amplifier and lowpass filter 154 are used to amplify the D.C. level difference to approximately 2 volts, so that the mode can be accurately discriminated with ease. But in principle, it is possible to eliminate the level shift circuit 153.

Figure 27:
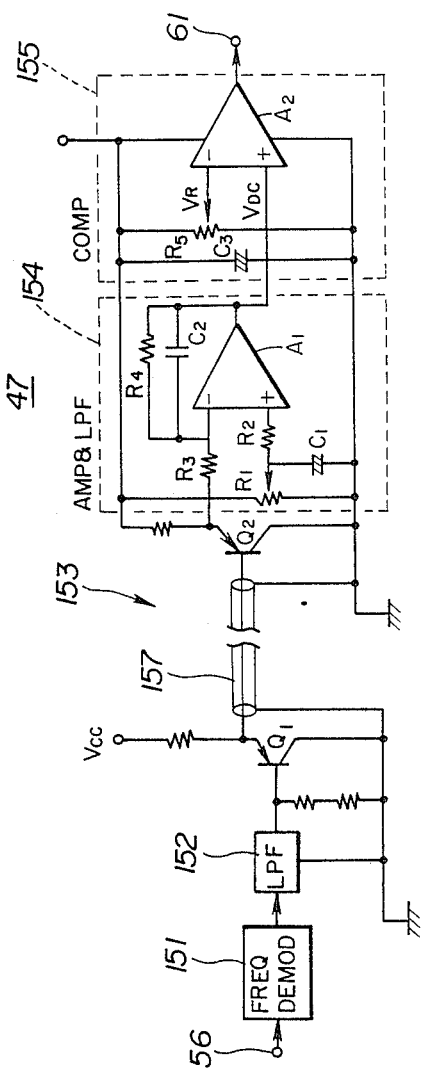
FIG. 27 is a circuit diagram showing the sixth embodiment of the mode discriminating circuit.

FIG. 27 shows the circuit construction of the present embodiment. In FIG. 27, those parts which are the same as those corresponding parts in FIG. 26 are designated by the same reference numerals. The level shift circuit 153 generally comprises transistors Q1 and Q2, and the emitter of the transistor Q1 and the base of the transistor Q2 are coupled by a coaxial cable 157. The amplifier and lowpass filter 154 comprises an operational amplifier A1, capacitors C1 and C2, a variable resistor R1 and resistors R2 through R4. The comparator 155 comprises an operational amplifier A2, a capacitor C3 and a variable resistor R5.

The reproduced luminance signal which is subjected to the level shifting operation carried out by the transistors Q1 and Q2 is applied to an inverting input terminal of the operational amplifier A1 via the resistor R3. On the other hand, a D.C. voltage which is obtained by dividing the power source voltage Vcc by the variable resistor R1 is applied to a non-inverting input terminal of the operational amplifier A1 via the resistor R2. The resistor R4 and the capacitor C2 constitute a lowpass filter. Accordingly, a D.C. voltage $V_{DC}$ corresponding to the average D.C. level of the reproduced luminance signal is outputted from the operational amplifier A1.

The D.C. voltage $V_{DC}$ is applied to a non-inverting input terminal of the operational amplifier A2. On the other hand, a reference voltage $V_R$ which is obtained by dividing the power source voltage Vcc by the variable resistor R5 is applied to an inverting input terminal of the operational amplifier A2. The operational amplifier A2 compares the D.C. voltage $V_{DC}$ with the reference voltage $V_R$ and produces the error signal (mode discrimination signal) dependent on the level difference between the two voltages. When the FM luminance signal is originally recorded in the standard mode, $V_{DC}$ is less than or equal to $V_R$ and the operational amplifier A2 produces a mode discrimination signal having a first logic level (low level, for example). But when the FM luminance signal is originally recorded in the high quality mode, $V_{DC}$ is greater than $V_R$ and the operational amplifier A2 produces a mode discrimination signal having a second logic level (high level, for example). Hence, it is possible to obtain a mode discrimination signal indicative of the mode with which the FM luminance signal was originally recorded at the time of the recording.

In the present embodiment, the average value of the entire reproduced luminance signal from the frequency demodulator 151 is derived, and for this reason, the D.C. level varies depending on the video information (picture content). The amplification in the amplifier part subsequent to the frequency demodulator 151 is thus selected to such a value that a D.C. level difference between the amplifier output for a 100% white signal in the standard mode and the amplifier output for a 100% black signal in the high quality mode is stable. In other words, the amplification is selected so that a minimum of the D.C. level difference between the amplifier outputs in the two modes is stable and is sufficient by large for carrying out the mode discrimination.

However, in the case where the video signal is greatly distorted due to a noise and the like, the average D.C. level may deviate above and below the reference voltage $V_R$. In this case, the level of the output mode discrimination signal of the comparator 155 changes at a high speed and the chattering occurs. In this case, the comparator 155 may be designed to have a hysteresis characteristic so as to prevent this chattering.

In FIG. 26, it is possible to omit the frequency demodulator 151 and the lowpass filter 152, and supply the output signal of the lowpass filter 49b shown in FIG. 1 to the level shift circuit 153. Furthermore, the circuit construction of the amplifier and lowpass filter 154 is not limited to that shown in FIG. 27, and any circuit having the function of detecting an average D.C. level may be used therefor.

Next, a description will be given on a seventh embodiment of the mode discriminating circuit 47 by referring to FIG. 28. In the present embodiment, the mode discriminating circuit 47 comprises a frequency demodulator 112, a lowpass filter 113, a sample and hold circuit 114a, a synchronizing signal separating circuit 115, a comparator 116a and a reference voltage source 117a. The reproduced FM luminance signal from the terminal 56 is frequency-demodulated in the frequency demodulator 112 and the carrier is eliminated in the lowpass filter 113. A reproduced luminance signal shown in FIG. 29(A) from the lowpass filter 113 is supplied to the sample and hold circuit 114a and the synchronizing signal separating circuit 115.

The synchronizing signal separating circuit 115 separates the horizontal synchronizing signal from the incoming reproduced luminance signal, and supplies a sampling pulse signal shown in FIG. 29(B) to the sample and hold circuit 114a. The sample and hold circuit 114a samples and holds a D.C. level $V_{DC1}$ within the interval of the horizontal synchronizing signal of the incoming reproduced luminance signal, that is, the D.C. level $V_{DC1}$ within the interval of the synchronizing tip level, responsive to the sampling pulse signal from the synchronizing signal separating circuit 115. A sample and held output of the sample and hold circuit 114a is supplied to a non-inverting input terminal of the comparator 116a.

On the other hand, a reference voltage $V_{R1}$ from the reference voltage source 117a is applied to an inverting input terminal of the comparator 116a. The comparator 116a compares the D.C. level $V_{DC1}$ with the reference volta $V_{R1}$ and produces a mode discrimination signal indicative of the compared result. This mode discrimination signal is supplied to the terminal 61.

For example, the reference voltage $V_{R1}$ is set to an approximate center level between D.C. level during the transmission interval of the synchronizing tip level in the standard mode and the D.C. level during the transmission interval of the synchronizing tip level in the high quality mode. Accordingly, when the FM luminance signal is originally recorded in the standard mode, $V_{DC1}$ is less than or equal to $V_{R1}$ and the mode discrimination signal from the comparator 116a has a first logic level. But when the FM luminance signal is originally recorded in the standard mode, $V_{DC1}$ is greater than $V_{R1}$ and the mode discrimination signal from the comparator 116a has a second logic level. For example, the first logic level is a low level and the second logic level is a high level.

Next, a description will be given on an eighth embodiment of the mode discriminating circuit 47 by referring to FIG. 30. In FIG. 30, those parts which are the same as those corresponding parts in FIG. 28 are designated by the same reference numerals, and a description thereof will be omitted. In the present embodiment, the mode discrimination circuit 47 additionally comprises a monostable multivibrator 119. A synchronizing signal separating circuit 115A separates a horizontal synchronizing signal b1 shown in FIG. 31(B) from an output reproduced luminance signal a1 of the lowpass filter 113 shown in FIG. 31(A). The monostable multivibrator 119 delays the horizontal synchronizing signal b1 and produces a sampling pulse signal c1 shown in FIG. 31(C). The monostable multivibrator 119 delays the horizontal synchronizing signal b1 to the back porch interval after the horizontal synchronizing signal. This sampling pulse signal c1 is supplied to a sample and hold circuit 114b.

Accordingly, the sample and hold circuit 114b samples and holds a D.C. level $V_{DC2}$ within the transmission interval of the pedestal level of the incoming reproduced luminance signal a1, responsive to the sampling pulse signal c1 from the monostable multivibrator 119.

For example, a reference voltage $V_{R2}$ of a reference voltage source 117b is set to an approximate center level between D.C. level during the transmission interval of the pedestal level in the standard mode and the D.C. level during the transmission interval of the pedestal level in the high quality mode. Accordingly, when the FM luminance signal is originally recorded in the standard mode, $V_{DC2}$ is less than or equal to $V_{R2}$ and the mode discrimination signal from a comparator 116b has a first logic level. But when the FM luminance signal is originally recorded in the standard mode, $V_{DC2}$ is greater than $V_{R2}$ and the mode discrimination signal from the comparator 116b has a second logic level.

Figure 32:
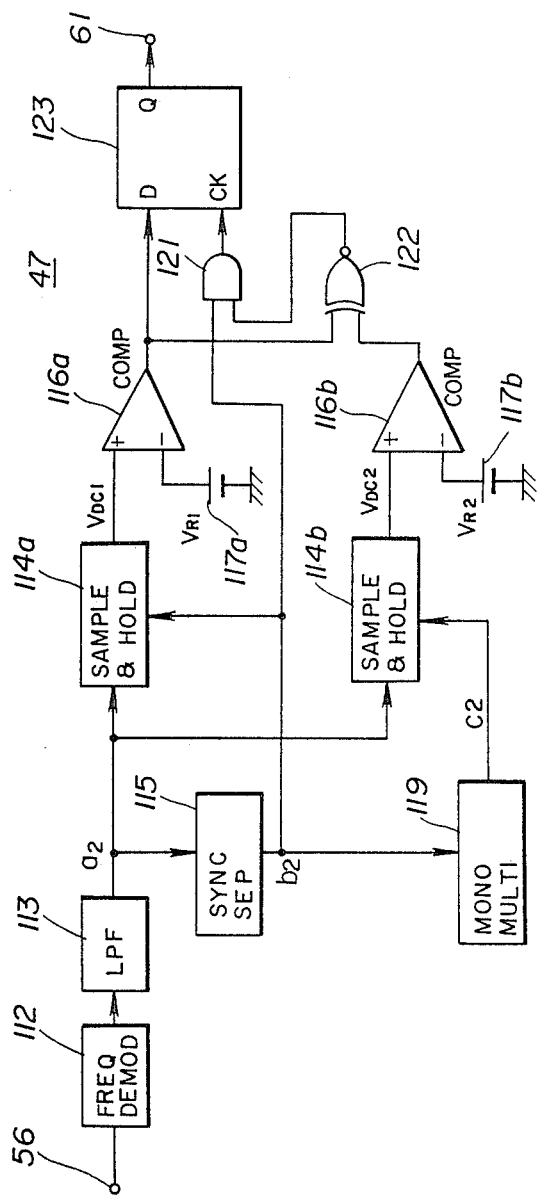
FIG. 32 is a system block diagram showing a ninth embodiment of the mode discriminating circuit in the block system shown in FIG. 1.

Next, a description will be given on a ninth embodiment of the mode discriminating circuit 47 by referring to FIG. 32. In FIG. 32, those parts which are the same as those corresponding parts in FIGS. 28 and 30 are designated by the same reference numerals, and a description thereof will be omitted. In the present embodiment, the mode discrimination circuit 47 additionally comprises an AND circuit 121, an exclusive-NOR circuit 122, and a delay flip-flop 123.

The synchronizing signal separating circuit 115 separates a horizontal synchronizing signal b2 shown in FIG. 33(B) from an output reproduced luminance signal a2 of the lowpass filter 113 shown in FIG. 33(A). The separated horizontal synchronizing signal b2 is supplied to the sample and hold circuit 114 as a first sampling pulse signal and to the AND circuit 121. On the other hand, the monostable multivibrator 119 delays the horizontal synchronizing signal b2 and produces a second sampling pulse signal c2 shown in FIG. 33(C). The sample and hold circuit 114a samples and holds a D.C. level $V_{DC1}$ during the transmission interval of the synchronizing tip level of the reproduced luminance signal a2, similarly as in the case of the seventh embodiment shown in FIG. 28. On the other hand, the sample and hold circuit 114b samples and holds a D.C. level $V_{DC2}$ during the transmission interval of the pedestal level of the reproduced luminance signal a2, similarly as in the case of the eighth embodiment shown in FIG. 30.

The comparator 116a compares the D.C. level $V_{DC1}$ with the reference voltage $V_{R1}$ and supplies an output first mode discrimination signal to a data terminal D of the flip-flop 123 and to one input terminal of the exclusive-NOR circuit 122. The comparator 116b compares the D.C. level $V_{DC2}$ with the reference voltage $V_{R2}$ and supplies an output second mode discrimination signal to the other input terminal of the exclusive-NOR circuit 122. An output signal of the exclusive-NOR circuit 122 is supplied to the other input terminal of the AND circuit 121, and an output signal of the AND circuit 121 is applied to a clock terminal CK of the flip-flop 123. An output mode discrimination signal of the mode discriminating circuit 47 is obtained from a Q-output terminal of the flip-flop 123.

The exclusive-NOR circuit 122 is a coincidence detection circuit and produces a high-level signal only when the levels of the first and second mode discrimination signals coincide, and otherwise produces a low-level signal. The AND circuit 121 supplies the horizontal synchronizing signal b2 to the clock terminal CK of the flip-flop 123 as a clock pulse signal only during the high-level period of the output signal of the exclusive-NOR circuit 122. Hence, the flip-flop 123 latches the first mode discrimination signal responsive to the clock pulse signal. Therefore, when the FM luminance signal is originally recorded in the standard mode, the mode discrimination signal from the flip-flop 123 has a first logic level. But when the FM luminance signal is originally recorded in the standard mode, the mode discrimination signal from the flip-flop 123 has a second logic level.

Next, a description will be given on the operating principle of third and fourth embodiments of the VTR according to the present invention, by referring to FIG. 34. As described before, the input frequency to the frequency demodulator is proportional to the output D.C. level. This means that the difference in the carrier frequencies and also the difference in the carrier frequency deviations between the output signals of the frequency demodulator in the standard and high quality modes appear as a D.C. level difference. Hence, in the reproduced (demodulated) luminance signal shown in FIG. 34, it is possible to discriminate the mode with which the FM luminance signal wave originally recorded based on a level difference between the synchronizing tip level and the pedestal level held constant regardless of the video information (picture content). In the present specification, this level difference between the synchronizing tip level and the pedestal level will be referred to as a synchronizing signal level difference. The third and fourth embodiments of the VTR uses this synchronizing signal level difference to discriminate the mode.

FIG. 35 shows an essential part of the third embodiment of the VTR. In FIG. 35, the illustration of the recording system is omitted, and the reproducing system is only shown for one head 29 so as to simplify the explanation. A pre-amplifier 201, an equalizer circuit 202, an FM AGC and dropout compensation circuit 203, a limiter 204, a frequency demodulator 205, a main de-emphasis circuit 206 and a sub de-emphasis circuit 207 constitute the reproducing system of the VTR. The FM luminance signal reproduced from the tape 30 by the head 29 is passed through this reproducing system, and a reproduced luminance signal is outputted via an output terminal 208.

The reproduced luminance signal from the main de-emphasis circuit 206 is applied to a terminal P of a switch 109. A composite video signal or a luminance signal which is to be recorded is applied to a terminal R of the switch 109 via a terminal 210. The switch 209 is connected to the terminal R in the recording mode and is connected to the terminal R in the reproducing mode. An AGC circuit 211 which is supplied with the output signal of the switch 209 is essentially the same as the AGC circuit provided in the recording system of the existing VTR, but this AGC circuit 211 is also used for the mode discrimination in the present embodiment. During the recording mode, the signal from the terminal 210 is passed through the AGC circuit 211 and is supplied to a luminance signal processing part of the recording system in the VTR via a terminal 212. Hence, the AGC circuit 211 is used for processing the composite video signal or the luminance signal during the recording mode.

But in the reproducing mode, the AGC circuit 211 is supplied with the reproduced luminance signal from the main de-emphasis circuit 206. An AGC detection terminal 213 of the AGC circuit 211 is grounded via a capacitor C and is also connected to a non-inverting input terminal of a comparator 214. An inverting input terminal of the comparator 214 is coupled to the power source voltage Vcc via a variable resistor 215. A slider 215a of the variable resistor 215 is adjusted and a reference voltage $V_R$ which is obtained by dividing the power source voltage Vcc is applied to the inverting input terminal of the comparator 214. The comparator 214 and the variable resistor 215 constitute a mode discriminating circuit 216.

A D.C. voltage $V_{DC}$ dependent on the synchronizing signal level difference described before is obtained from the AGC detection terminal 213 of the AGC circuit 211 and is supplied to the non-inverting input terminal of the comparator 214. Hence, the comparator 214 compares the D.C. voltage $V_{DC}$ with the reference voltage $V_R$ and produces an error signal dependent on the level difference. This error signal is outputted via a terminal 217 as the mode discrimination signal.

The slider 215a is adjusted so that the reference voltage $V_R$ is set to an approximate center value between the synchronizing signal level difference for the standard mode and the synchronizing signal level difference for the high quality mode. Accordingly, $V_{DC}$ is less than or equal to $V_R$ when the FM luminance signal is originally recorded in the standard mode, and the comparator 214 produces a mode discrimination signal having a first logic level. On the other hand, $V_{DC}$ is greater than $V_R$ when the FM luminance signal is originally recorded in the high quality mode, and the comparator 214 produces a mode discrimination signal having a second logic level. Therefore, the mode discrimination signal may be used to select the appropriate reproducing system for the reproduced luminance signal, similarly as in the case of the first embodiment described before. The present embodiment is advantageous in that the AGC circuit 211 originally provided in the recording system of the existing VTR may be used for the mode discrimination.

Figure 36:
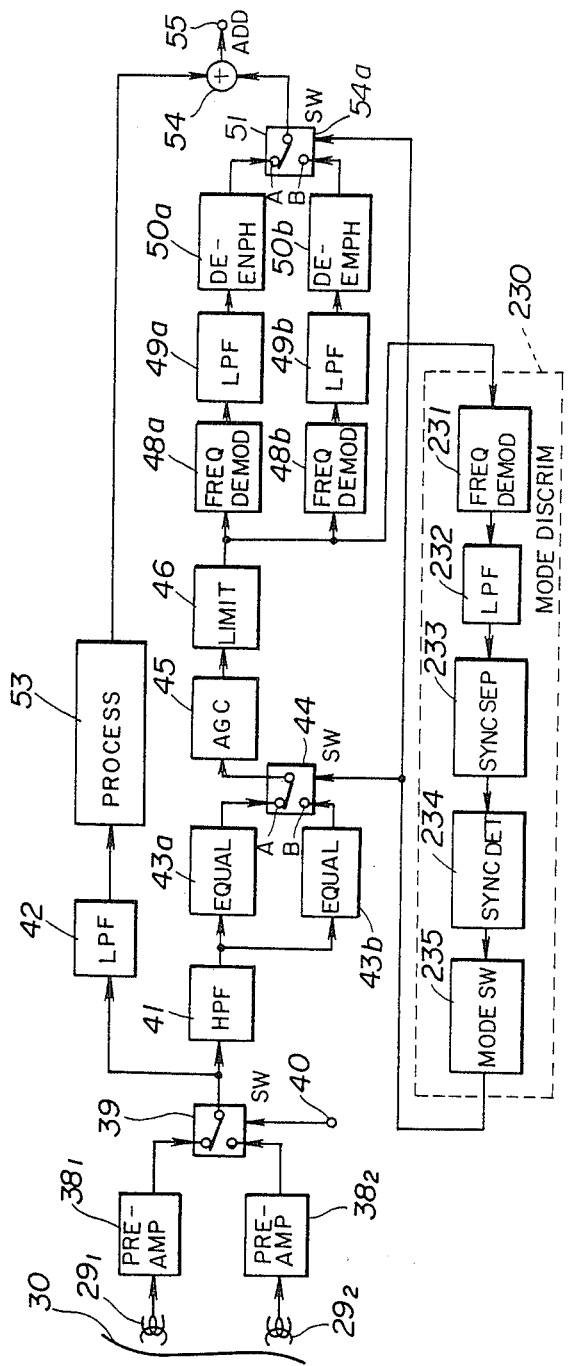
FIG. 36 is a system block diagram showing the fourth embodiment of the magnetic recording and/or reproducing apparatus.

FIG. 36 shows an essential part of the fourth embodiment of the VTR. In FIG. 36, the illustration of the recording system is omitted, and those parts which are the same as those corresponding parts in FIG. 1 are designated by the same reference numerals and a description thereof will be omitted. In the present embodiment, a mode discriminating circuit 230 comprises a frequency demodulator 231, a lowpass filter 232, a synchronizing signal separating circuit 233, a synchronizing signal detecting circuit 234, and a mode switching circuit 235. The frequency demodulator 231 is supplied with the reproduced FM luminance signal from the limiter 46, and the carrier of a reproduced luminance signal from the frequency demodulator 231 is eliminated in the lowpass filter 232.

The synchronizing signal separating circuit 233 separates the horizontal synchronizing signal from the output reproduced luminance signal of the lowpass filter 232. The synchronizing signal detecting circuit 234 detects the synchronizing signal level difference from the horizontal synchronizing signal, and produces a detection signal indicative of the detected synchronizing signal level difference. The mode switching circuit 235 generates a mode discrimination signal responsive to the detection signal from the synchronizing signal detecting circuit 234, and this mode discrimination signal is supplied to the switches 44 and 51 as the switching pulse signal. Hence, the switches 44 and 51 are connected to the terminals A when the mode discriminating circuit 230 discriminates that the FM luminance signal is originally recorded in the standard mode. On the other hand, the switches 44 and 51 are connected to the terminals B when the mode discriminating circuit 230 discriminates that the FM luminance signal is originally recorded in the high quality mode.

In the present embodiment, it is also possible to omit the frequency demodulator 231 and the lowpass filter 232, and supply the output signal of the lowpass filter 49b to the synchronizing signal separating circuit 233.

FIG. 37 shows an embodiment of the synchronizing signal detecting circuit 234 and the mode switching circuit 235 of the mode discriminating circuit 230. The synchronizing signal detecting circuit 234 comprises a comparator 240 and a reference voltage source 241 for supplying a reference voltage $V_A$. The mode switching circuit 235 comprises a lowpass filter 242, a comparator 243 and a reference voltage source 244 for supplying a reference voltage $V_B$.

The horizontal synchronizing signal from the synchronizing signal separating circuit 233 is applied to a terminal 245 and is supplied to a non-inverting input terminal of the comparator 240. The horizontal synchronizing signal is thus compared with the reference voltage $V_A$. FIG. 38(A) shows the horizontal synchronizing signal obtained when the FM luminance signal is originally recorded in the standard mode, and FIG. 39(A) shows the horizontal synchronizing signal obtained when the FM luminance signal is originally recorded in the high quality mode. In FIGS. 38(A) and 39(A), the reference voltage $V_A$ is indicated by a phantom line.

When the horizontal synchronizing signal shown in FIG. 38(A) is obtained from the terminal 245, a signal shown in FIG. 38(B) is outputted from the comparator 240 and is supplied to the lowpass filter 242 which produces a signal shown in FIG. 38(C). On the other hand, when the horizontal synchronizing signal shown in FIG. 39(A) is obtained from the terminal 245, a signal shown in FIG. 39(B) is outputted from the comparator 240 and is supplied to the lowpass filter 242 which produces a signal shown in FIG. 39(C). The signal shown in FIG. 38(C) or 39(C) is compared with the reference voltage $V_B$ indicated by a phantom line in FIGS. 38(C) and 39(C). Hence, a mode discrimination signal shown in FIG. 38(D) is obtained from the comparator 243 via a terminal 246 when the signal shown in FIG. 38(C) is supplied to the comparator 243, and a mode discrimination signal shown in FIG. 39(D) is obtained from the comparator 143 via the terminal 246 when the signal shown in FIG. 39(C) is supplied to the comparator 243. In other words, the mode discrimination signal shown in FIG. 38(D) is obtained from the mode discriminating circuit 230 when the FM luminance signal is originally recorded in the standard mode, and the mode discrimination signal shown in FIG. 39(D) is obtained from the mode discriminating circuit 230 when the FM luminance signal is originally recorded in the high quality mode.

It is evident that the present invention may also be applied to a VTR having one or more modes in addition to the standard and high quality modes.

Further, the present invention is not limited to these embodiments, and various variations and modifications may be made without departing from the scope of the present invention.

What is claimed is:

1. A magnetic recording and/or reproducing apparatus having at least first and second recording and/or reproducing modes, the recording of a signal on a magnetic tape in said second mode being carried out with a carrier frequency higher than that in said first mode, said apparatus comprising:

recording and/or reproducing means for recording and/or reproducing a signal on and/or from a magnetic tape accommodated within a tape cassette which is loaded into said apparatus;

cassette discriminating means for discriminating whether the loaded tape cassette accommodates a first magnetic tape or a second magnetic tape in a recording mode, said first magnetic tape being intended for play exclusively in said first mode, said second magnetic tape being intended for play primarily in said second mode but being playable in said first mode;

mode discriminating means for discriminating from a reproduced signal which is reproduced by said recording and/or reproducing means from the magnetic tape of the loaded tape cassette in a reproducing mode a mode with which the magnetic tape was recorded at the time of the recording; and switching means for automatically switching an operation mode of said apparatus to a predetermined one of said first and second modes responsive to the discrimination made by said cassette discriminating means in the recording mode and responsive to the discrimination made by said mode discriminating means in the reproducing mode.

2. A magnetic recording and/or reproducing apparatus as claimed in claim 1 in which said cassette discriminating means comprises a mechanical detector for discriminating the kind of magnetic tape accommodated within the loaded tape cassette by mechanically detecting a cassette discriminating part of the loaded tape cassette, said cassette discriminating part of the tape cassette indicating the kind of magnetic tape accommodated therein.

3. A magnetic recording and/or reproducing apparatus as claimed in claim 1 in which said cassette discriminating means comprises an optical detector for discriminating the kind of magnetic tape accommodated within the loaded tape cassette by optically detecting a cassette discriminating part of the loaded tape cassette, said cassette discriminating part of the tape cassette indicating the kind of magnetic tape accommodated therein.

4. A magnetic recording and/or reproducing apparatus as claimed in claim 1 in which said switching means automatically switches the operation mode of said apparatus to said predetermined mode responsive to the discrimination made by said cassette discriminating means in the recording mode and responsive to the discrimination made by said mode discriminating means in the reproducing mode.

5. A magnetic recording and/or reproducing apparatus as claimed in claim 1 in which said switching means includes means for manually setting the operation mode of said apparatus to said first mode when the loaded tape cassette accommodates the second magnetic tape.

6. A magnetic recording and/or reproducing apparatus as claimed in claim 1 in which said mode discriminating means discriminates the mode with which the magnetic tape was recorded at the time of the recording based on the carrier frequency of the reproduced signal.

7. A magnetic recording and/or reproducing apparatus as claimed in claim 1 in which said mode discriminating means discriminates the mode with which the magnetic tape was recorded at the time of the recording based on the carrier frequency corresponding to a pedestal level of the reproduced signal.

8. A magnetic recording and/or reproducing apparatus as claimed in claim 1 in which said mode discriminating means discriminates the mode with which the magnetic tape was recorded at the time of the recording based on the carrier frequency corresponding to a pedestal level in a horizontal blanking period and/or a vertical blanking period of the reproduced signal.

9. A magnetic recording and/or reproducing apparatus as claimed in claim 1 in which said mode discriminating means discriminates the mode with which the magnetic tape was recorded at the time of the recording based on the carrier frequency corresponding to a synchronizing tip level of the reproduced signal.

10. A magnetic recording and/or reproducing apparatus as claimed in claim 1 in which said mode discriminating means discriminates the mode with which the magnetic tape was recorded at the time of the recording based on the carrier frequency corresponding to a synchronizing tip level in a horizontal blanking period and/or a vertical blanking period of the reproduced signal.

11. A magnetic recording and/or reproducing apparatus as claimed in claim 1 in which said mode discriminating means discriminates the mode with which the magnetic tape was recorded at the time of the recording based on the carrier frequency corresponding to a pedestal level and a synchronizing tip level of the reproduced signal.

12. A magnetic recording and/or reproducing apparatus as claimed in claim 1 in which said mode discriminating means discriminates the mode with which the magnetic tape was recorded at the time of the recording based on a D.C. level of the reproduced signal.

13. A magnetic recording and/or reproducing apparatus as claimed in claim 1 in which said mode discriminating means discriminates the mode with which the magnetic tape was recorded at the time of the recording based on a D.C. level during a pedestal interval and/or a synchronizing interval of the reproduced signal.

14. A magnetic recording and/or reproducing apparatus as claimed in claim 1 in which said mode discriminating means discriminates the mode with which the magnetic tape was recorded at the time of the recording based on a carrier frequency deviation of the reproduced signal.

* * * * *